United States Patent
Park et al.

(10) Patent No.: US 11,018,764 B2
(45) Date of Patent: May 25, 2021

(54) NON-IMAGING RECEIVER UTILIZING MIRRORS IN OPTICAL WIRELESS COMMUNICATION SYSTEM

(71) Applicant: King Abdullah University of Science and Technology, Thuwal (SA)

(72) Inventors: Kihong Park, Thuwal (SA); Hassan M. Oubei, Thuwal (SA); Boon S. Ooi, Thuwal (SA); Mohamed-Slim Alouini, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 206 days.

(21) Appl. No.: 16/326,624

(22) PCT Filed: Aug. 31, 2017

(86) PCT No.: PCT/IB2017/055249
§ 371 (c)(1),
(2) Date: Feb. 19, 2019

(87) PCT Pub. No.: WO2018/042370
PCT Pub. Date: Mar. 8, 2018

(65) Prior Publication Data
US 2020/0241285 A1    Jul. 30, 2020

Related U.S. Application Data

(60) Provisional application No. 62/383,229, filed on Sep. 2, 2016.

(51) Int. Cl.
*H04B 10/11*      (2013.01)
*H04B 10/116*      (2013.01)
(Continued)

(52) U.S. Cl.
CPC .......... *H04B 10/11* (2013.01); *H04B 10/116* (2013.01); *H04J 14/00* (2013.01);
(Continued)

(58) Field of Classification Search
CPC ...... H04B 10/11; H04B 10/116; H04B 10/00; H04B 10/114; H04J 14/00; G02B 26/0816
(Continued)

(56) References Cited

U.S. PATENT DOCUMENTS

| 6,697,184 | B1 | 2/2004 | Keller et al. | |
| 2005/0147419 | A1* | 7/2005 | Verdiell | ............... H01S 5/4087 398/214 |

(Continued)

FOREIGN PATENT DOCUMENTS

| EP | 2587694 A1 | 5/2013 |
| WO | 2008129552 A1 | 10/2008 |

OTHER PUBLICATIONS

Notification of Transmittal of the International Search Report and the Written Opinion of the International Searching Authority, or the Declaration for PCT/IB2017/055249 dated Apr. 20, 2018.
(Continued)

*Primary Examiner* — Dalzid E Singh
(74) *Attorney, Agent, or Firm* — Billion & Armitage

(57) ABSTRACT

An optical mirror diversity receiver for a visible light communication system is provided with an array of photodiodes each having an optical-signal-receiving area, with a mirror positioned between an adjacent pair of photodiodes to preferentially redirect light toward one of the photodiodes while also blocking light that would otherwise be received at the photodiode. An angle-aided mirror diversity receiver is also provided with surfaces of the photodiodes aligned relative to the mirror to yield reductions in correlation.

20 Claims, 13 Drawing Sheets

(51) Int. Cl.
   H04J 14/00    (2006.01)
   G02B 26/08    (2006.01)
   H04B 10/114   (2013.01)
   H04B 10/00    (2013.01)
(52) U.S. Cl.
   CPC .......... *G02B 26/0816* (2013.01); *H04B 10/00* (2013.01); *H04B 10/114* (2013.01)
(58) Field of Classification Search
   USPC .......................................................... 398/43
   See application file for complete search history.

(56) References Cited

U.S. PATENT DOCUMENTS

2016/0308615 A1* 10/2016 Videv ................. H04B 10/116
2017/0201321 A1*  7/2017 Uysal ................. H04B 10/516
2017/0276767 A1*  9/2017 Ho ....................... H04B 10/502

OTHER PUBLICATIONS

Park, et al., "A Novel Mirror Diversity Receiver for Indoor MIMO Visible Light Communication Systems" 1260-1265, Mar. 2016.
Park, et al., "Design and Experimental Demonstration of Mirror-Aided Non-Imaging Receiver for Indoor MIMO-VLC Systems" 2016.
Park, et al., "Optimization of an Angle-aided Mirror Diversity Receiver for Indoor MIMO-VLC Systems" 2016.
Ansari, et al., "Performance Analysis of Free-Space Optical Links Over Málaga (M) Turbulence Channels With Pointing Errors", IEEE Transactions on Wireless Communications, Jan. 2016, 91-102.
Arnon, et al., "Advanced Optical Wireless Communication Systems", Mar. 9, 2019, 1-4.
Azhar, et al., "A Gigabit/s Indoor Wireless Transmission Using MIMO-OFDM Visible-Light Communications", IEEE Photonics Technology Letters, Jan. 15, 2013, 171-174.
Burton, et al., "Experimental Demonstration of 50-Mb/s Visible Light Communications Using 4×4 MIMO", IEEE Photonics Technology Letters, May 1, 2014, 945-948.
Fahamuel, et al., "Improved Indoor VLC MIMO Channel Capacity Using Mobile Receiver with Angular Diversity Detectors", Optical Network and Systems Symposium, 2014, 2060-2065.
Fath, et al., "Performance Comparison of MIMO Techniques for Optical Wireless Communications in Indoor Environments", IEEE Transaction on Communications, Feb. 2013, 733-742.
He, et al., "MIMO Optical Wireless Receiver Using Photodetectors with Different Fields of View", IEEE, 2015, 1-5.
Kahn, "Wireless Infrared Communications", Proceedings of the IEEE, Feb. 1997, 265-298.
Nuwanpriya, et al., "Indoor MIMO Visible Light Communications: Novel Angle Diversity Receivers for Mobile Users", IEEE Journal on Selected Areas in Communications, Sep. 2015, 1780-1792.
O'Brien, et al., "Visible Light Communications: challenges and possibilities", IEEE, 2008, 1-5.
Park, et al., "A Novel Mirror Diversity Receiver for Indoor MIMO Visible Light Communication Systems", IEEE Transactions on Wireless Communications PP(99):1-1—Jun. 2017, http://hdl.handle.net/10754/602274.
Park, et al., "On the Power and Offset Allocation for Rate Adaptation of Spatial Multiplexing in Optical Wireless MIMO Channels", IEEE Transactions on Communications, Apr. 2013, 1535-1543.
Proakis, et al., "Digital Communications, Fifth Edition", McGraw-Hill Higher Education, 2008, 1-3.
Te, et al., "High-Spatial-Diversity Imaging Receiver Using Fisheye Lens for Indoor MIMO VLCs", IEEE Photonics Technology Letters, Nov. 15, 2014, 2260-2263.
Wang, et al., "Analysis of an Optical Wireless Receiver Using a Hemispherical Lens With Application in MIMO Visible Light Communications", Journal of Lightwave Technology, Jun. 1, 2013, 1744-1754.
Wang, et al., "Demonstration of High-Speed 2×2 Non-Imaging MIMO Nyquist Single Carrier Visible Light communication With Frequency Domain Equalization", Journal of Lightwave Technology, Jun. 1, 2014, 2087-2093.
Wang, et al., "MIMO Optical Wireless Communications Using ACO-OFDM and a Prism-Array Receiver", IEEE Jouma on Selected Areas in Communications, Sep. 2015, 1959-1971.
Zeng et al., "High Data Rate Multiple Input Multiple Output (MIMO) Optical Wireless Communications Using White LED Lighting", IEEE Journal on Selected Areas in Communications, Dec. 2009, 1654-1662.
Extended European Search Report for EP Application No. 20186839.5 dated Feb. 11, 2021.

* cited by examiner

FIG. 8
FIG. 9
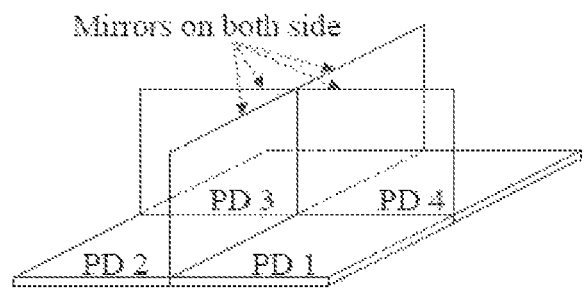
(a) Case I : MDR with four PDs
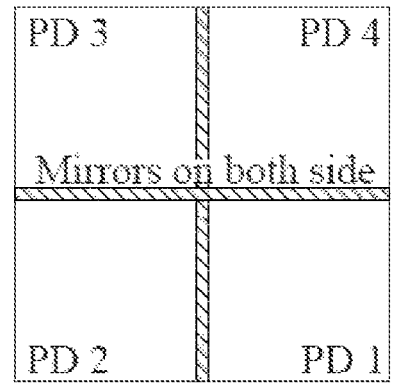
(b) Top view of Case I
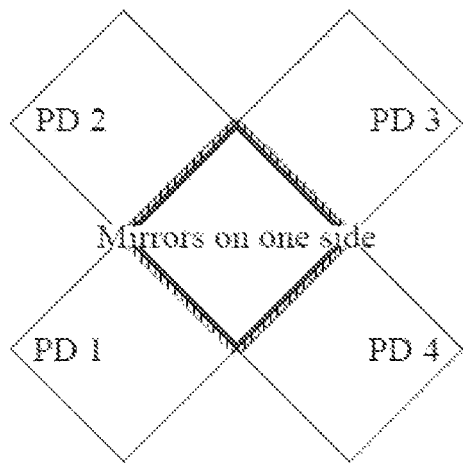
(c) Case II : Alternative design of MDR with four PDs
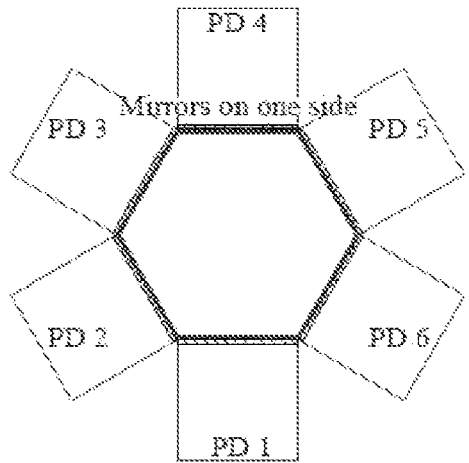
(d) Case III : MDR with six PDs
FIG. 10
FIG. 11

NON-IMAGING RECEIVER UTILIZING MIRRORS IN OPTICAL WIRELESS COMMUNICATION SYSTEM

BACKGROUND

Advances in the development and fabrication of light emitting diodes (LED) and laser diodes (LD) have made these technologies inexpensive, efficient and ubiquitous. Their ubiquity now enables the development of visible light communication (VLC) systems as an emerging technology using light for illumination and data transmission.

Indoor LED and LD lighting systems are characterized by multiple light sources embedded in ceilings. This configuration can be exploited in multiple-input multiple-output (MIMO) visible light communication (VLC) systems. Such systems have the potential to achieve high data rates via the transmission of different data streams from different LED or LD sources. Indeed, experiments have shown that indoor MIMO-VLC systems can transmit gigabits of data. Despite the speed of data transmission, using a spatial-multiplexing MIMO scheme remains a challenge because of the resulting highly correlated channel matrix which prevents the received signals from being decoded in parallel by the receiver.

SUMMARY

In general, embodiments of the present disclosure describe a non-imaging photodetector (PD) receiver deploying one or more light-directing mirrors positioned relative to the photodetectors. Applications suitable for such receivers include optical wireless multiple-input multiple-output (MIMO) systems suffering from high correlation, e.g., visible light communication (VLC) and free space optical (FSO) communication systems, such as utilizing intensity modulation and direct detection.

One object of embodiments of the present invention is to reduce channel correlation to provide higher data transmission rates. Embodiments of the present disclosure yield improved performance, e.g., bit error rate and capacity, as compared to existing receiver designs pursuing the same goal of reduction in channel correlation.

Deployment of one or more mirrors at the PD receiver yields a reduction in channel matrix correlation. Mirror deployment at the PD receiver not only reduces the channel gain in a specific direction (by blocking the light) but it also improves the channel gain in other directions (by receiving the light reflected by a mirror). The mirror design allows lower channel correlation as well as channel gain improvement as compared to existing non-imaging receivers, e.g., angle-diversity receivers, line-blocked receivers and spatially separated receivers.

Embodiments of the present disclosure provide a mirror between the PDs to destructively reduce channel gains from a specific direction by blocking the light and constructively increase the channel gain from another direction by reflecting light toward the PD. Mirror height can be optimized to maximize channel capacity.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which:

FIG. 8 illustrates a perspective view of an alternative embodiment of an MDR in accordance with the present invention.

FIG. 9 illustrates a top view of FIG. 8.

FIG. 10 illustrates a top view of an alternative embodiment of an MDR in accordance with the present invention.

FIG. 11 illustrates a top view of another alternative embodiment of an MDR in accordance with the present invention.

DETAILED DESCRIPTION

Figure 1:
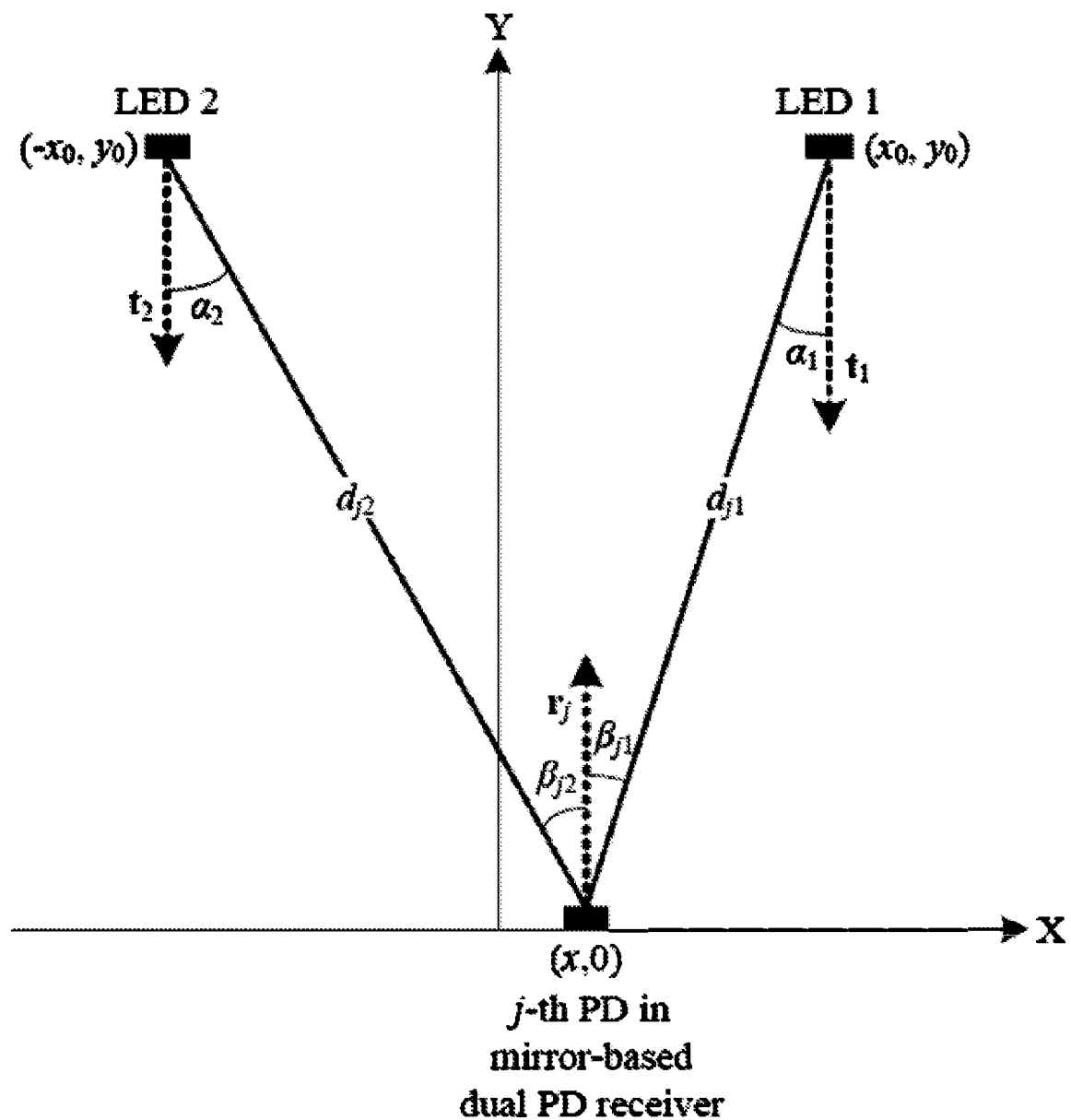
FIG. 1 illustrates a system model of a mirror diversity receiver (MDR) in accordance with one or more embodiment of the present invention.

The invention of the present disclosure relates to optical wireless communication systems. In particular, FIG. 1 illustrates one embodiment of an optical wireless communication MIMO system in accordance with the present invention. A mirror diversity receiver (MDR) model is described to include a transmitter having two LEDs and a receiver having a pair of photodetectors (PDs). Intensity modulation and direct detection (IM-DD) scheme for modulation and demodulation were implemented in the system. Only direct line-of-sight (LoS) links were considered, and reflections were not considered.

The MDR of FIG. 1 can be further explained with a system model. For simplicity, the transmitter-receiver pair was aligned in the two-dimensional cartesian coordinate. The MDR could be extended to three-dimensional space. Each LED was symmetrically located over the X-axis and in the same height in the Y-axis, i.e., the i-th LED is on the point $((3-2_i)x_0, y_0)$, where $x_0>0$ and $y_0>0$. Each LED irradiates the light in the Lambertian radiation pattern centered in the direction of unit vector $t_i$. The distance between two PDs, $\Delta_x$, was relatively small compared to the transmission distance and two PDs are co-located on the point $(x\pm\Delta_x/2, 0)\approx(x, 0)$. By doing so, the transmission distances and the irradiance angles between the i-th LED and both PDs are the same, i.e., $d_{1i}=d_{2i}=d_i$ and $\alpha_{1i}=\alpha_{2i}=\alpha_i$. The j-th PD plane is oriented in the direction of unit vector $r_j$.

denotes the FoV coefficient of the PD and the Lambertian emission order is given as $m=-\ln 2/\ln(\cos \Phi\frac{1}{2})$, where $\Phi\frac{1}{2}$ denotes the semi-angle at half-power of light emission in LED. In the conventional non-imaging receiver using the PDs with the same PD plane size, the active area of PDs for each channel element is the same as A. The high correlation between channel vectors with respect to two LEDs prevents the utilization of spatial multiplexing MIMO transmission and decoding in a conventional receiver.

TABLE 1

Table 1 provides definitions for the system model:
Definition of notations and their relation characterizing the system model

| Definitions | Notations | Relations[1] |
|---|---|---|
| Locations of the i-th LED | $x_i$ | $x_i = [(3 - 2i)x_0\ y_0]^T$ |
| Location of receiver | $x_r$ | $x_r = [x\ 0]^T$ |
| Transmission distance from the i-th LED to the j-th PD | $d_{ji}$ | $d_{ji} = \|x_i - x_r\|$ |
| Incident vector of light irradiation in center | $t_i$ | — |
| Incident vector of light from the i-th LED to the j-th PD | $d_{ji}$ | $d_{ji} = \dfrac{x_r - x_i}{d_{ji}}$ |
| Incident vector of oriented angle in the j-th PD | $r_j$ | — |
| Incident angle of light at the i-th LED to the j-th PD | $\alpha_{ji}$ | $\cos \alpha_{ji} = d_{ji} \cdot t_i$ |
| Incident angle of light at the j-th PD from the i-th LED | $\beta_{ji}$ | $\cos \beta_{ji} = -d_{ji} \cdot r_j$ |
| Length of one side of a PD in the shape of a square | $d_p$ | — |
| Height of a double-sided mirror | $h_M$ | — |
| Incident angle of light into the mirror | $\beta_{Mj}$ | $\cos \beta_{Mj} = -d_{jj} \cdot [0\ 1]^T$ |
| Incident angle of reflected light into the j-th PD | $\tilde{\beta}_{jj}$ | $\cos \tilde{\beta}_{jj} = -(\text{Diag}(-1, 1)d_{jj}) \cdot r_j$ |
| Maximum length that the reflected light can reach or be blocked | $\tilde{d}_{ji}$ | $\tilde{d}_{ji} = \begin{cases} \min\left(\dfrac{h_M \sin\beta_{Mi}}{\cos\tilde{\beta}_{ii}}, d_p\right), & i = j \\ \min\left(\dfrac{h_M \sin\beta_{Mi}}{\cos\beta_{ji}}, d_p\right), & i \neq j \end{cases}$ |

[1]$x \cdot y$ denotes the inner product of x and y and Diag(a, b) denoted a diagonal matrix with diagonal elements of a and b.

Figure 2:
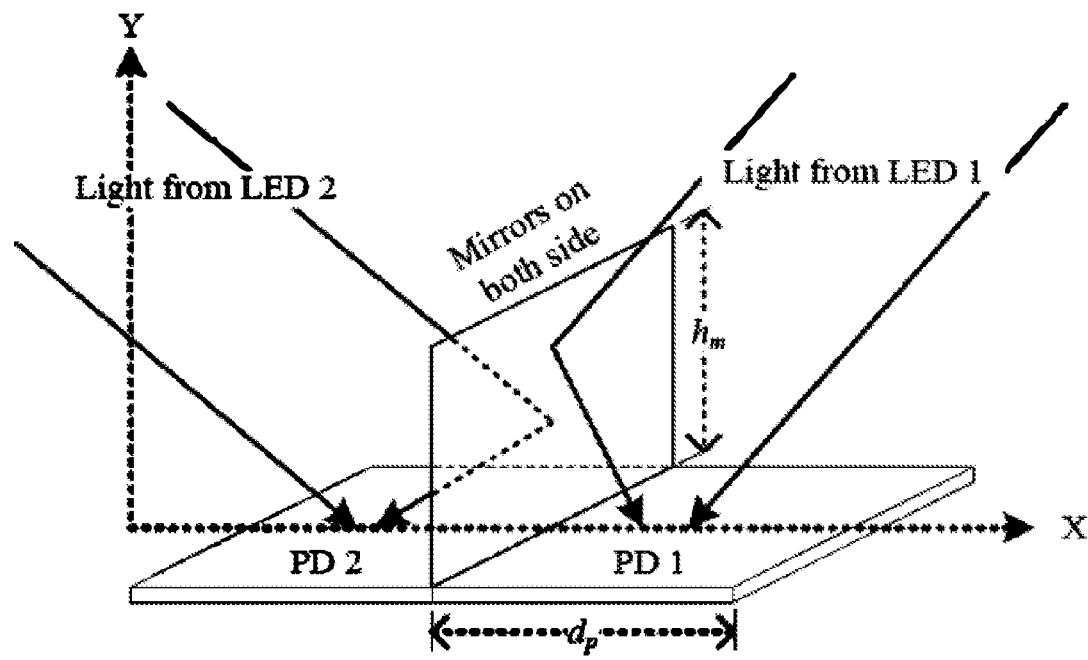
FIG. 2 illustrates a perspective depiction of mirror diversity receiver (MDR) in accordance with FIG. 1.

Each electrical signal was modulated for the input of each LED and converted to the intensity signal $s_i$ for $i=1, 2$. At the receiver, each PD provides direct detection to an electrical current signal $y_j$ for $j=1, 2$ proportionally to the received intensity signal. For the sake of simplicity, the received signal can be represented in vector space as $$y = Hs + n, \quad (1)$$

where $n=[n_1\ n_2]^T$ denotes independent and identically distributed (i.i.d.) additive white Gaussian noise (AWGN) vectors with zero mean and variance of $\sigma^2_{nj}=N_0/2$. $H \in \mathbb{R}^{2\times 2}$ is the channel matrix whose element $h_{ji}$ represent the channel gain between the i-th LED and the j-th PD.

$$h_{ji} = \frac{(m+1)A_{ji}}{2\pi d_{ji}^2}\cos^m\alpha_{ji}\cos^k\beta_{ji}, |\alpha_{ji}| \leq \frac{\pi}{2}, |\beta_{ji}| \leq \frac{FoV}{2}, \quad (2)$$

and $h_{ji}=0$, otherwise. Here, $\alpha_{ji}$, $\beta_{ji}$, and $A_{ji}$ are the irradiance angle at the i-th LED to the receiver, the incident angle at the j-th PD from the i-th LED, the transmission distance between the i-th LED and j-th PD and the active area of the j-th PD with respect to the i-th LED. Each angle can be computed as $$\cos \alpha_{ji} = d_{ji} \cdot t_i \quad (3)$$

$$\cos \beta_{ji} = -d_{ji} \cdot r_j \quad (4)$$

where $d_{ji}$ denotes the direction vector from the i-th LED to the j-th PD which is given by $dji=[x-(3-2i)x_0 - y_0]^T/d_{ji}$. k FIG. 2 describes a mirror diversity receiver (MDR) according to one embodiment of the present disclosure. In this example, a two-sided mirror is aligned perpendicularly to the X-axis between two PDs and achieves low correlation channel vectors. Depending on the oriented direction of incident light, each PD can receive more light intensity due to the reflective light from the mirror, while, at the same time, the incident light from the other direction is blocked by the mirror. By doing so, each PD exploits the spatial directivity to successfully separate the intensity signal of one LED from that of the other LED.

Figure 3:
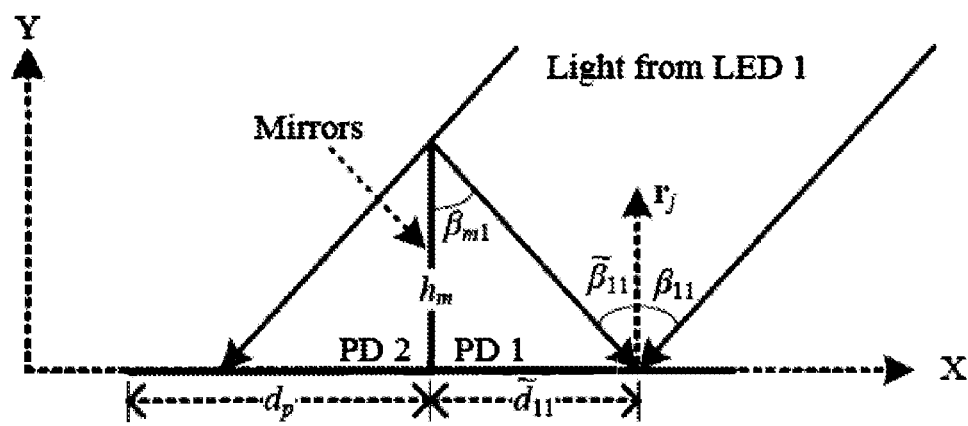
FIG. 3 depicts reception of light from LED1 of FIG. 2.

For example, as shown in FIG. 3, PD1 gains more light intensity by reflective light from the mirror, while PD2 has the shaded plane not receiving the light from the first LED due to the blockage of the mirror. This example shows reception of incident light from the first LED with $r_j=[0\ 1]^T$. The additional channel gain and the loss of channel gain due to the mirror can be calculated to determine the channel matrix at the MDR. Only the channel matrix in the range of $x\geq 0$ was analyzed due to the symmetry. It was assumed that the active area of two PDs is in the shape of square with the same area $A=d_p^2$, where $d_p$ is the length of one side. The height of mirror was defined as $h_m$. Depending on the location of the LED relative to the location of receiver, the channel gain of each PD either increased or decreased.

Considering two scenarios in which the receiver can be located, i.e., between two LEDs, $0 \leq x < x0$ or outside of two LEDs, $x \geq x0$, the channel matrix at the MDR can be determined.

Scenario 1: $0 \leq x < x_0$

The received intensity through direct LOS link without the mirror can be obtained by equation (2). In addition, there exists some received intensity or loss of intensity due to the mirror. As illustrated in FIG. 1, in this scenario, the i-th PD can gather more reflective light from the i-th LED, while it loses some amount of intensity from the other LED due to the blockage by mirror. The increased and decreased amount of intensity is proportional to the effective active area at each PD which can gather the reflective light or can be shaded by the mirror. In order to calculate the effective active area receiving extra reflective light, the incident angles of light into the mirror and reflective light into the PD plane are calculated as:

$$\cos \beta_{mj} = -d_{jj} \cdot [0\ 1]^T$$

$$\cos \tilde{\beta}_{jj} = -(T_m d_{jj}) \cdot r_j, \quad (5)$$

where $T_m$ denotes the transformation matrix due to the mirror which is given by $T_m =$ [−1 0 0 1]. As shown in FIG. 3, the effective maximum length of one side as $\tilde{d}_{ji}$ in PD plane which the reflective light can reach in the case of i=j or be blocked in the case of i≠j. It can be computed by using the trigonometric identities as $$\tilde{d}_{ji} = \begin{cases} \min\left(\dfrac{h_m \sin\beta_{mi}}{\cos\tilde{\beta}_{ji}}, d_p\right), & i = j \\ \min\left(\dfrac{h_m \sin\beta_{mi}}{\cos\tilde{\beta}_{ji}}, d_p\right), & i \neq j \end{cases}, \quad (6)$$

where the identity of $\tilde{\beta}_{ji} = \beta_{ji}$ is used in case of i≠j for notational simplicity. The effective active area which receives the reflective light or is shaded can be calculated as $\tilde{A}_{ji} = \tilde{d}_{ji} d_p$. Therefore, the overall channel gain at the MDR can be computed as equation (7) where $\eta_m \in [0, 1]$ denotes mirror reflection coefficient that is equal to one with the only perfect mirror and $\delta_k$ is the Dirac delta function where $\delta_k = 1$ for k=0 and $\delta_k = 1$ otherwise.

$$\tilde{h}_{ji} = \begin{cases} h_{ji} + (-1)^{i+j}\eta_m^{\delta_{j-i}} \dfrac{(m+1)\tilde{A}_{ji}}{2\pi d_{ji}^2} \cos^m\alpha_{ji} \cos^k\tilde{\beta}_{ji}, & \text{if } |\alpha_{ji}| \leq \dfrac{\pi}{2}, |\beta_{ji}| \leq \dfrac{FoV}{2}, |\tilde{\beta}_{ji}| \leq \dfrac{FoV}{2} \\ h_{ji}, & \text{if } |\alpha_{ji}| \leq \dfrac{\pi}{2}, |\beta_{ji}| \leq \dfrac{FoV}{2}, |\tilde{\beta}_{ji}| > \dfrac{FoV}{2} \end{cases} \quad (7)$$

From equation (7), the channel gains of diagonal components in the channel matrix are increased compared with that at the conventional receiver, while that of off-diagonal components are reduced. This signifies that the two channel vectors for the first and second LED can be further uncorrelated by introducing the MDR.

Scenario 2: $x \geq x_0$

It is clear that some of the intensity signals from both LEDs are blocked at PD1 due to the mirror, while the reflected intensity signals increase the channel gain at PD2. Similarly, to the previous section, the channel gain can be calculated by equation (8).

$$\tilde{h}_{ji} = \begin{cases} h_{ji} + (-1)^j \eta_m^{\delta_{j-2}} \dfrac{(m+1)\tilde{A}_{ji}}{2\pi d_{ji}^2} \cos^m\alpha_{ji} \cos^k\tilde{\beta}_{ji}, & \text{if } |\alpha_{ji}| \leq \dfrac{\pi}{2}, |\beta_{ji}| \leq \dfrac{FoV}{2}, |\tilde{\beta}_{ji}| \leq \dfrac{FoV}{2} \\ h_{ji}, & \text{if } |\alpha_{ji}| \leq \dfrac{\pi}{2}, |\beta_{ji}| \leq \dfrac{FoV}{2}, |\tilde{\beta}_{ji}| > \dfrac{FoV}{2} \end{cases} \quad (8)$$

When j=1, the channel gains in the first row in the channel matrix are reduced compared to that at the conventional receiver. On the other hand, when j=2, the channel gains in the second row in the channel matrix are increased.

The performance of the MDR was evaluated as compared to the other receivers. As an assumption, the incident vector of PD was set to $r_j = [0\ 1]^T$. With this assumption, it was noted the following identities held; $\beta_{mj} = \tilde{\beta}_{jj} = \beta_{ij} \triangleq \beta_j$ for i≠j. For simplicity, using $A_{ji} = A$, $d_{ji} \triangleq d_1$, and $\alpha_{ii} = \alpha_{ji} \triangleq \alpha_i$, the channel gain at the MDR can be computed as equation (9), $$\tilde{h}_{ji} = \begin{cases} \dfrac{(m+1)}{2\pi d_i^2} \cos^m \alpha_i \cos^k \beta_k \left(A + (-1)^{i+j}\eta_m^{\delta_{j-i}} d_p \tilde{d}_i\right), & \text{if } |\alpha_i| \leq \dfrac{\pi}{2}, |\beta_i| \leq \dfrac{FoV}{2}, 0 \leq x < x_0 \\ \dfrac{(m+1)}{2\pi d_i^2} \cos^m \alpha_i \cos^k \beta_k \left(A + (-1)^j \eta_m^{\delta_{j-i}} d_p \tilde{d}_i\right), & \text{if } |\alpha_i| \leq \dfrac{\pi}{2}, |\beta_i| \leq \dfrac{FoV}{2}, x \geq x_0 \end{cases} \quad (9)$$

where $\tilde{d}_i = \min(h_m \tan \beta_i, d_p)$ can be easily computed by manipulating equation (6) and defining $\tilde{d}_{ii} = \tilde{d}_{ji} \triangleq \tilde{d}_i$. As apparent from equation (9), it is the worst-case scenario for the conventional receiver ($h_m=0$) to use the spatial multiplexing MIMO since two transmit intensity signals from the first and the second LED are the scaled signals that are perfectly overlapped in the same direction vector of $[1/\sqrt{2}\ 1/\sqrt{2}]^T$ and it cannot decode two transmit signals. For simplicity, the indicator function was defined to establish if the incident angle of light falls into the range of receiver FoV, i.e., $$u_i = \begin{cases} 1, & \text{if } |\beta_i| \leq \frac{FoV}{2} \\ 0, & \text{if } |\beta_c| > \frac{FoV}{2} \end{cases}. \quad (10)$$

Letting $\xi i \triangleq (m+1)/2\pi d_i^2 \cos^m \alpha_i \cos^k \beta_i u_i$, and the element of effective active-area matrix $\tilde{A}$ $$\tilde{A}_{ji} = \begin{cases} A + (-1)^{i+j} \eta_m^{j-i} d_p \tilde{d}_i, & \text{if } 0 \leq x < x_0 \\ A + (-1)^j \eta_m^{\delta_j - 2} d_p d_i, & \text{if } x \geq x_0 \end{cases}$$

The channel matrix at the pure MDR can be represented as $$\tilde{H} = \tilde{A}\mathrm{diag}(\xi_1, \xi_2), \quad (11)$$

where $\mathrm{diag}(\xi_1, \xi_2)$ denotes the diagonal matrix consisting of the elements $\xi_1$ and $\xi_2$. For conventional receiver with $h_m=0$, the effective active-area matrix is $\tilde{A}=A\mathbf{1}\mathbf{1}^T$ and the rank of the channel matrix is $\mathrm{rank}(H)=\mathrm{rank}(A\mathbf{1}\mathbf{1}^T \mathrm{diag}(\xi_1, \xi_2))=1$. Again, this proved that the conventional receiver cannot support multiplexing MIMO in this worst-case scenario. On the other hand, the channel matrix at the MDR of FIG. 1 ($h_m>0$) consists of product of two rank-two matrices of $A^\sim$ and $\mathrm{diag}(\xi_1, \xi_2)$ and can support multiplexing MIMO.

The channel capacity of the MIMO system was evaluated with the known channel state information (CSI) at the receiver only. When the average electrical SNR at the transmitter was constrained on $[E[\|s\|^2]=P$ and the power was equally allocated to each LED, the channel capacity can be computed as:

$$C = \tfrac{1}{2} \log_2 \det|I + \rho\tilde{H}\tilde{H}^T|. \quad (12)$$

where $\rho \triangleq P\,N/0$ is the average electrical SNR per LED. Using equation (11), it can be rewritten as $$C = \frac{1}{2}\log_2 \prod_{m=1}^{2} (1+\rho\lambda_m) \quad (13)$$

$$= \frac{1}{2}\log_2\!\left(1 + \rho(\xi_1 \tilde{A}_{11} + \xi_2 \tilde{A}_{22}) + \rho^2 \xi_1 \xi_2(\tilde{A}_{11}\tilde{A}_{22} - \tilde{A}_{12}\tilde{A}_{21})\right),$$

where $\lambda_m$ denotes the eigenvalues of the channel matrix $\tilde{H}\tilde{H}^T$.

It was noted that system capacity depended on the height of mirror $h_m$ and could be maximized with optimal hm. For analysis, a perfect mirror was assumed, i.e., $\eta_m=1$.

Theorem 1 (Optimal Height of Mirror): The channel capacity of 2×2 MIMO-VLC two-dimensional systems with the pure MDR with perfect mirror is maximized with the optimal height of mirror as follows. For $0 \leq x < x_0$, $$h_m^* \geq \frac{d_p}{\tan \beta_1}. \quad (14)$$

A brief explanation of the proof of Theorem 1 follows. For $0 \leq x < x_0$, the channel capacity was calculated for three cases of $\tilde{d}_1$ and $\tilde{d}_2$, i.e., $(\tilde{d}_1, \tilde{d}_2) \in \{(d_p, d_p), (h_m \tan \beta_1, d_p), (h_m \tan \beta_1, h_m \tan \beta_2)\}$. The optimal $h_m$ occurred at only the boundaries of range in which each case of $(\tilde{d}_1, \tilde{d}_2)$ falls. The optimal $h_m$ can be found analytically by comparing the capacities for $h_m$ at those boundaries.

The system model in FIG. 1 was evaluated using the following parameters given in Table II below.

TABLE II

SYSTEM PARAMETERS FOR SIMULATION

| | Parameters | Values |
|---|---|---|
| LED | Location at $(x_0, y_0)$ and $(-x_0, y_0)$ | $(\pm 2, 3)^\dagger$ |
| | Direction vector of irradiation in center $(t_i)$ | $[0\ -1]^T$ |
| | Semi-angle at a half power $(\Phi_{1/2})$ | 60° |
| | Lambertian emission order (m) | 1 |
| MDR | Location at (x, 0) | $0 \leq x \leq 3$ |
| | Direction vector of PD orientation $(r_j)$ | $[0\ 1]^T$ |
| | Receiver field-of-view (FoV) | 180° |
| | FoV coefficient (k) | 1 |
| | Active area of PD (A) | 1 cm$^2$ |
| | Length of one side at PD plane $(d_p)$ | 1 cm |
| | Height of mirror $(h_m)$ | 1 cm$^\ddagger$ |
| | Reflection coefficient of mirror $(\eta_m)$ | 0.8$^\ddagger$ |

$^\dagger$The unit of distance is meter (m).
$^\ddagger$Unless otherwise stated.

Initially, a fixed height mirror was utilized. For comparison, the MDR system of FIGS. 1-3 was compared to other MIMO-VLC nonimaging receivers, i.e., spatially separated receiver (SSR), line blocked receiver (LBR), and angle diversity receiver (ADR). Typical system parameters for LEDs and PDs were the same as provided in Table II. The separation between two PDs in SSR was defined as $x_s=10$ cm and it was assumed that two PDs at SSR are located at the points $(x \pm x_s/2, 0)$. For LBR, it was assumed that the specific links from the i-th LED to j-th PD for $i \neq j$ are perfectly blocked to make the channel matrix uncorrelated. Thus, it was assumed that non-diagonal elements of channel matrix at LBR were zero, i.e., $h_{ji}=0$ for all $i \neq j$. For ADR, it was necessary to determine the optimal angle of PD orientation which was numerically obtained to maximize the channel capacity for each receiver position.

Figure 4:
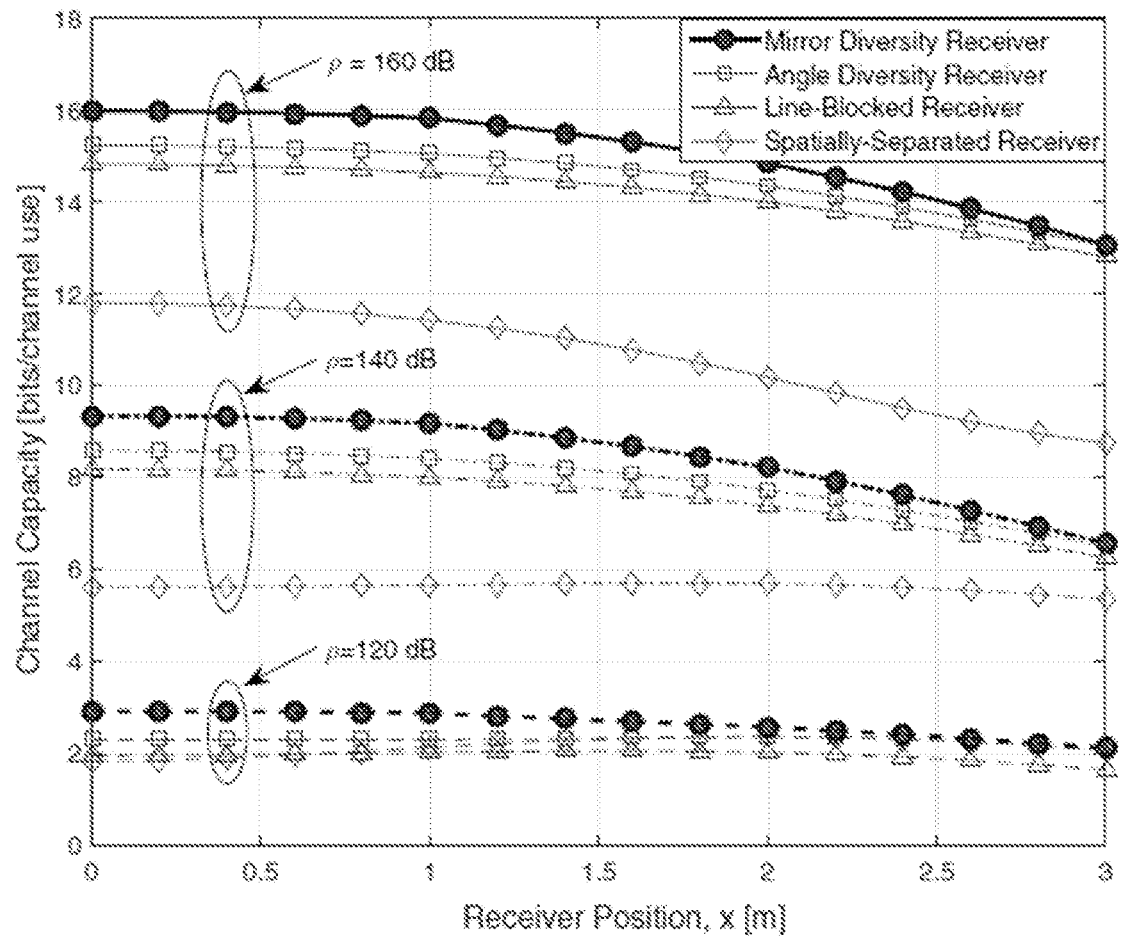
FIG. 4 illustrates a graphical comparison of channel capacity and receiver position for various receivers.

FIG. 4 illustrates the channel capacity of 2×2 MIMOVLC system with various receivers (mirror diversity, angle diversity, line-blocked, spatially separated) with respect to the receiver position for different SNRs. Due to the small size of active area in PD, the channel gains $\tilde{h}_{ji}$ (or $h_{ji}$) in the system were nearly around 60 dB, which signified that $\rho$ should be at least 120 dB for reasonable performance. Therefore, three scenarios were considered with $\rho=120$, 140, and 160 dB. As shown in FIG. 4, the MDR of the present invention outperforms the existing receivers at all positions and SNRs of interest.

The constructive effect on the channel gain by receiving the reflective light can further improve the system performance unlike the other receivers only utilizing the destructive effect on the channel gain by blocking the link. For $\rho=120$ dB which means low received SNR, the performance gap between the MDR system and the other receivers is smaller than that in high received SNR regime with $\rho=160$ dB. The MDR system provides better performance even though mirror height was not optimized.

Figure 5:
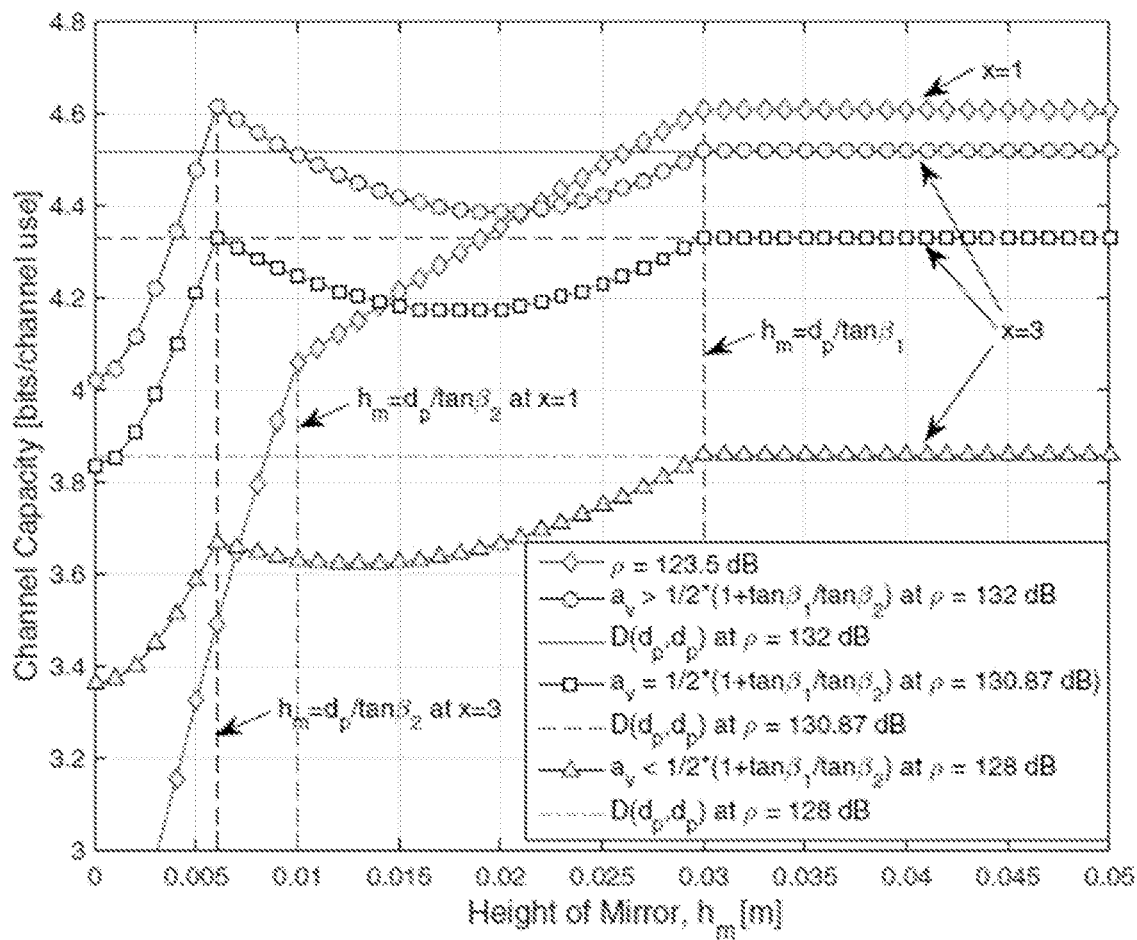
FIG. 5 illustrates a graphical representation of MDR channel capacity as a function of mirror height.

FIG. 5 illustrates the channel capacity of the MDR with respect to the height of perfect mirror $h_m$ at different receiver positions, x=1 and x=3. For the arbitrarily chosen SNRs, FIG. 5 verifies the validity of Theorem 1 describing the optimal height of perfect mirror. The optimal height of the perfect mirror in high-receive SNR regime was only 6 mm which is smaller than $d_p$. This signifies that the optimal pure MDR can be compactly implemented. Moreover, there exists a trade-off between system performance and the implementation cost (height of mirror) when $x < x_0$.

Bit error rate (BER) performance of the MDR was also evaluated with the L-ary pulse amplitude modulation (PAM) was utilized at the transmitter. The analytical BER of a 2×2 multiplexing MIMO-VLC can be approximated as $$BER \approx \frac{L-1}{L} \sum_{l=1}^{2} Q\left(\sqrt{\frac{6\rho\lambda_l \log_2 L}{(L^2-1)}}\right),$$

where $$\rho \triangleq \frac{P}{N_0}$$

is the average electrical signal-to-noise ratio (SNR) per LED, $\lambda_l$ denotes the eigenvalues of the channel matrix $HH^H$ and we define $$Q(x) = \frac{1}{\sqrt{2\pi}} \int_x^\infty \exp(-t^2/2) dt.$$

Figure 6:
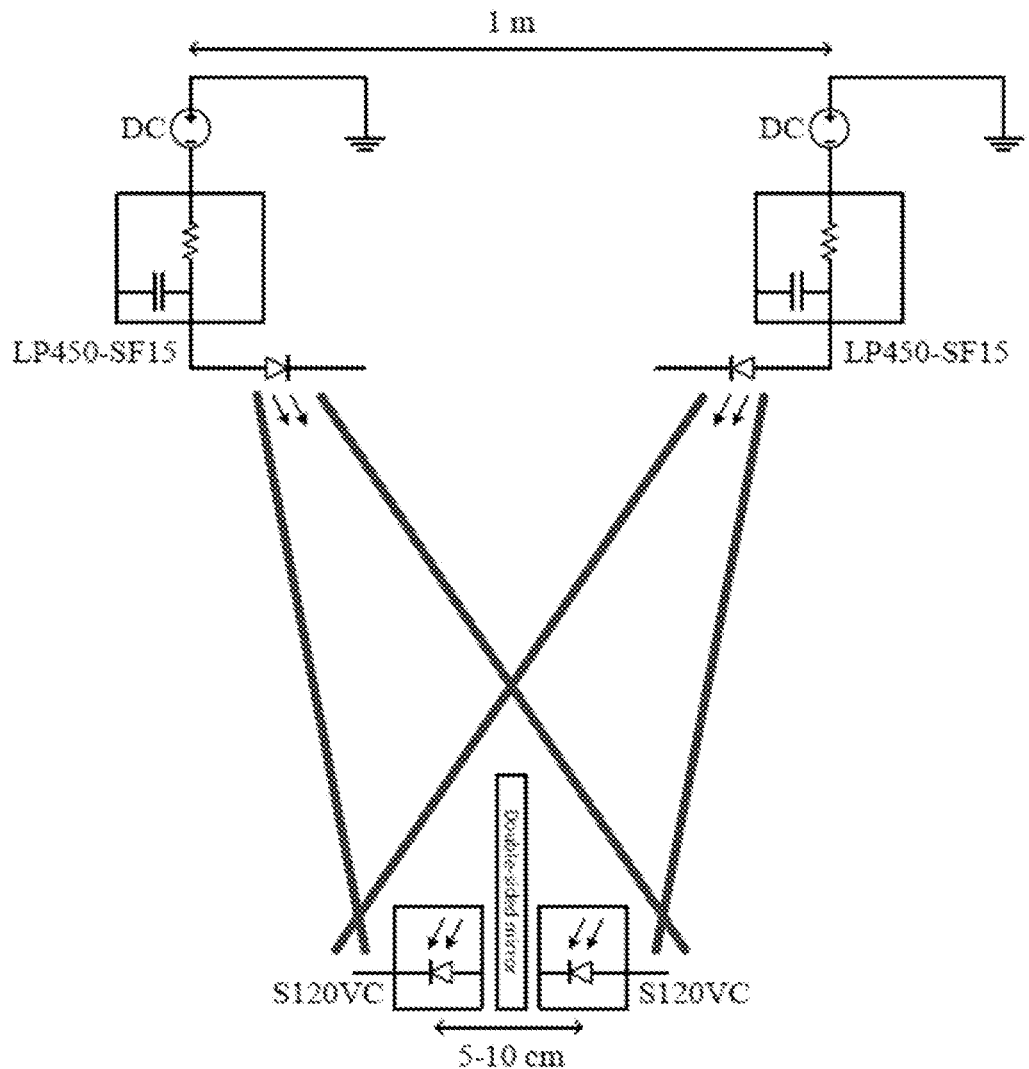
FIG. 6 depicts a schematic of an experiment used to verify MDR performance.

Experimental results validated the MDR in a 2×2 multiplexing MIMOVLC system. A schematic of an experimental setup is shown in FIG. 6. Two identical Thorlabs LP-450-SF15 blue LDs were used as transmitters and placed at the positions equivalent to (0.5, 1) and (−0.5, 1) in a two-dimensional geometric model. The two LDs were controlled by a TC4005 Benchtop Laser Diode/TEC Controller. The light beam was well diffused to cover a wide area. Light fell on the receiver to enable the MIMO system. Although LDs were used rather than LEDs to generate the diffused light beam, the superiority of the MDR system can be verified in MIMO-VLC systems with any diffused lighting source.

The receiver unit consisted of two Thorlabs S120VC silicon photodiode sensors with active areas of 9.7×9.7 mm² and a two-sided plane aluminum glass mirror with an estimated average reflectance in excess of 90% in the visible wavelength range. The mirror was assembled by adhering together the back surfaces of two commercially available mirrors. The receiver unit was located at two coordinate positions at (0, 0). The two PDs were separated by 5 cm for all receivers. The system parameters for the experiment are listed in Table 2 below.

TABLE 2

Experimental system parameters

| Parameters | Values |
|---|---|
| Location of LEDs at (±$x_0$, $y_0$) | (±0.5, 1)[†] |
| Direction vector of irradiation in center ($t_i$) | $t_i = d_{ji}$ |
| Semi-angle at a half power ($\Phi_{1/2}$) | 30° |

TABLE 2-continued

Experimental system parameters

| Parameters | Values |
|---|---|
| Location at PDs at (x, 0) | x = 0 |
| Direction vector of PD orientation ($r_j$) | $[0\ 1]^T$ |
| Receiver field-of-view (FoV) | 180° |
| Active area of PD (A) | 0.94 cm² |
| Length of one side at PD plane ($d_p$) | 0.94 cm |
| Height of mirror ($h_M$) | Optimal |
| Reflection coefficient of mirror ($\eta_M$) | 0.9 |

[†]The unit of distance is meter (m).

No optics were used to collimate or focus the laser light. All measurements were made under ambient room illumination conditions.

The average received power on each detector from each LD is given by:

$$\mathbb{E}[y_{ji}] = P_{R_{ji}} = h_{ji} P_{T_j} + P_{bg_j}$$

where $P_{R_{ji}}$, $P_{T_j}$, and $P_{bg_j}$ denote the average received power, the transmit power, and the background noise power, respectively. Given the measured $P_{R_{ji}}$ and $P_{bg_j}$, the experimental channel matrix, H, is calculated as $$h_{ji} = \frac{P_{R_{ji}} - P_{bg_j}}{P_{T_j}},$$

with $P_{T_j}$=0.919 mW for each LD. Then, based on the channel matrix measurement after calibrating the responsivity of LD and PD, the BER performance was evaluated when the 4-ary PAM was utilized at the transmitter.

For comparison, channel gains were measured for aforementioned existing receivers. The separation between two PDs in SSR is defined as $x_s$=10 cm and it was assumed that two PDs at SSR are located at the points (x±xs/2,0). It was also assumed that non-diagonal elements of the channel matrix at LBR are zero to make channel matrix uncorrelated, i.e., $h_{ji}$=0 for all i≠j. ADR requires the optimal angle of the PD's orientation, which were numerically obtained to maximize the channel capacity for each receiver position.

Figure 7:
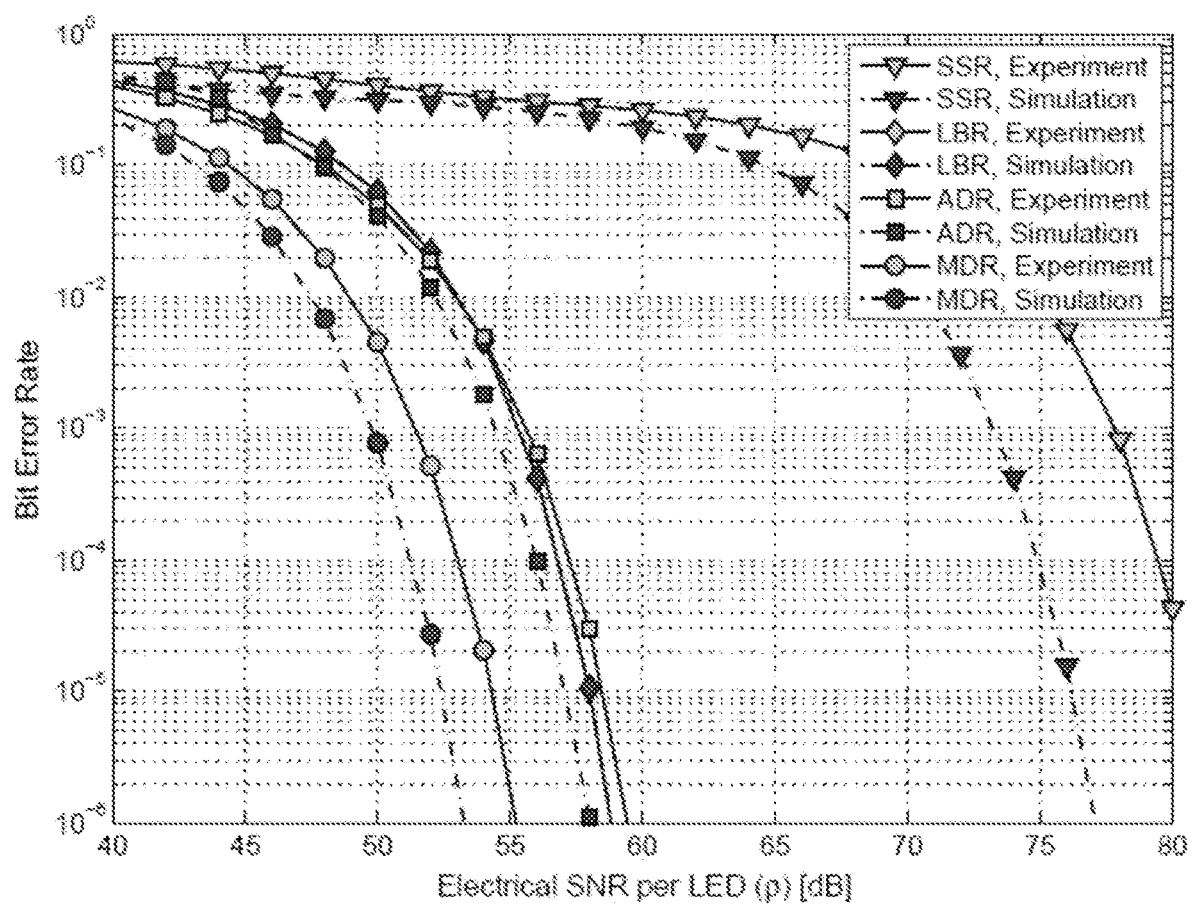
FIG. 7 illustrates a graphical representation of bit error rates and SNR for various receivers.

FIG. 7 illustrates a graphical comparison of the BER of several non-imaging receivers (SSR, LBR, ADR, MDR). The simulations matched well with the experimental results although a disparity exists between the simulation and experiment results due to ambient light noise. In accordance with the simulation results, it was confirmed that the MDR outperforms the other receivers. It was observed that the MDR system offered almost 4 to 5 dB SNR gain over LBR and ADR. It was also observed that the mirror between the PDs completely blocks the light to be received at the PD beyond it. The SNR gain of the MDR system over that of LBR comes from the constructive effect of the mirror by improving the channel gain from the reception of reflected light.

There are alternative embodiments to the above-described non-imaging MDR system utilizing a two-sided mirror. In order to generalize a MDR with multiple PDs, one can arrange an MDR isotropically to obtain the directivity by placing the two-sided mirrors in the middle of multiple PDs. FIGS. 8-11 illustrate an example of a MDR structure with four and six PDs. Hatching lines in the figures depict one or more mirrors. FIG. 8 and FIG. 9 show the case of extension to 2-dimensional MDR structure by using four PDs and installing the two-sided mirror on both coordinates.

In FIG. 10 and FIG. 11, the receiver structure design is used to provide directivity. This receiver geometry allows one to easily generalize the receiver structure with arbitrary number of PDs. One could install the one-side mirror inside of each PD in order to provide directivity.

$2^{nd}$ System Model

Figure 12:
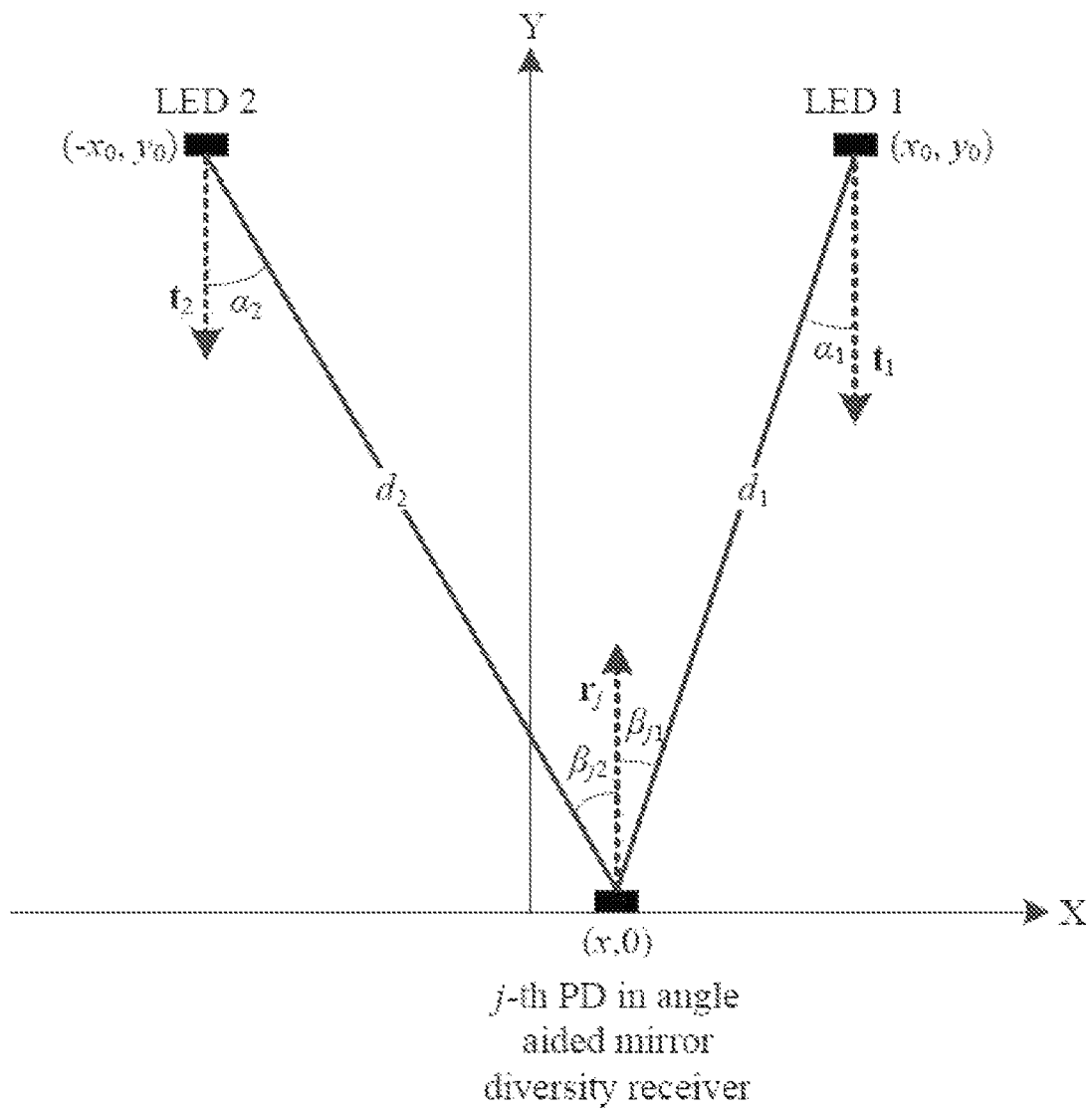
FIG. 12 illustrates a geometric model of an alternative embodiment of the present disclosure.

FIG. 12 illustrates a second geometric model of a 2×2 MIMO optical wireless communication system. A two-dimensional geometric model is shown with the transmitter equipped with two LEDs and an angle-aided mirror diversity receiver (AMDR) including two co-located PDs. A direct line-of-sight (LoS) link is assumed and the reflective signals from other obstacles were ignored for simplified analysis. At the transmitter side, each LED symmetrically located over X-axis and in the same height in Y-axis, i.e., the i-th LED is on the point $((3-2i)x_0, y_0)$, where $x_0>0$ and $y_0>0$. Each LED irradiated the light in a Lambertian radiation pattern centered in the direction of unit vector $t_i$. At the receiver side, it was assumed that the compact receiver size compared with the transmission distance and two PDs were co-located on the point (x, 0). This implied that the transmission distances and the irradiance angles between the i-th LED and both PDs were the same, i.e., $d_{1i}=d_{2i}=d_i$ and $\alpha_{1i}=\alpha_{2i}=\alpha_i$. It was also assumed that each LED was located at the ceiling corner of an indoor room and the receiver is located between two LEDs, i.e., $-x_0 \leq x \leq x_0$.

Figure 13:
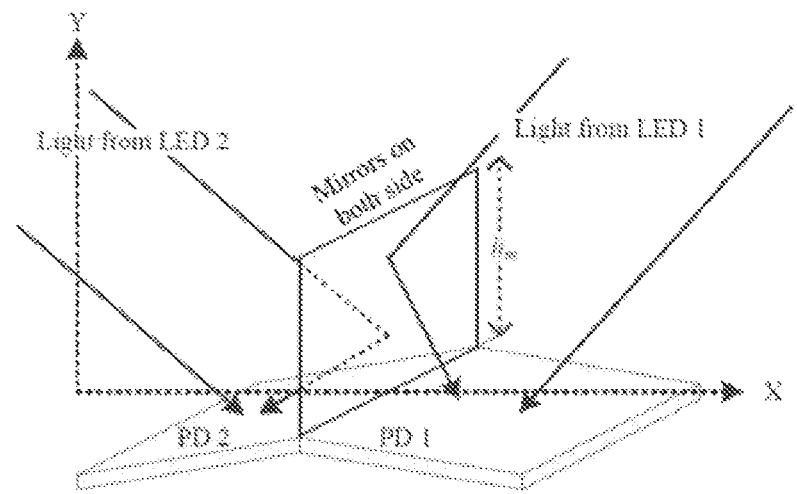
FIG. 13 illustrates a perspective view of an angle-aided diversity receiver embodiment of the present disclosure.
Figure 14:
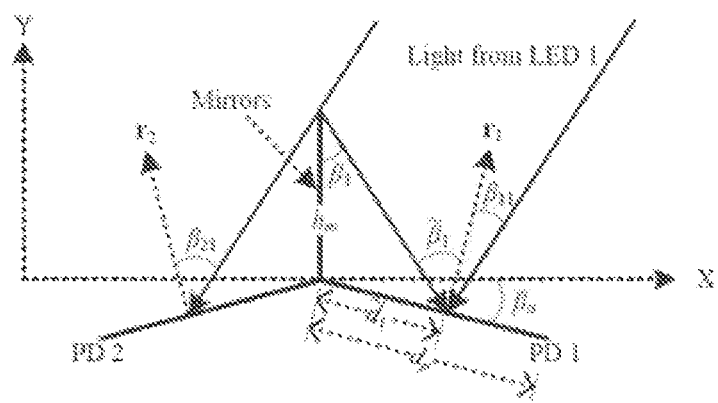
FIG. 14 illustrates a side view of the angle-aided diversity receiver of FIG. 13.

FIG. 13 and FIG. 14 illustrates a model of the AMDR system which exploits angle diversity by tilting the receiver plane with the elevation angle $\beta_a$ as well as the mirror diversity by deploying the mirror with the height $h_M$. It is noted that the j-the PD plane is oriented in the direction of unit vector r. It was assumed that the active area of PD is in the shape of square with the length of one side $d_p$, i.e., the active area was computed as $A=d_p^2$. For simplicity, the indicator function, $u\theta$, was defined to verify if the incident angle of light, $\theta$, fell into the range of receiver FoV, i.e., $$u_\theta = \begin{cases} 1, & \text{if } |\theta| \leq \frac{FoV}{2} \\ 0, & \text{if } |\theta| > \frac{FoV}{2} \end{cases} \quad (1)$$

An intensity modulation and direct detection (IM-DD) scheme was used because of its lower implementation complexity compared with coherent reception. Each electrical signal was modulated for the input of each LED and converted to the intensity signal $s_i$ for i=1, 2. On-off keying (OOK) modulation with $s_i \in \{0, 2P_t\}$ was used and the transmit power was constrained on $E[si]=P_t$ for each LED. The OOK modulation is widely used in indoor visible light communication due to its simplicity.

At the receiver, each PD performed direct detection to recover an electrical current signal $y_j$ for j=1, 2 proportionally to the received intensity signal. For the sake of simplicity, the received signal can be represented in vector space as $$y = Hs + n \quad (2)$$

where $n=[n1\ n2]^T$ denotes independent and identically distributed (i.i.d.) additive white Gaussian noise (AWGN) vectors with zero mean and variance of $\sigma^2_{nj}=N_0/2$.[3] $H \in \mathbb{R}^{2 \times 2}$ is the 2×2 channel matrix whose element $h_{ji}$ represents the channel gain between the i-th LED and the j-th PD. Hereinafter, the channel gain was considered in the range of $0 \leq x \leq x0$ due to the symmetry, which chain gain is given by:

$$h_{ji} = \xi_i \left( \cos^k \beta_{ji} u_{\beta_{ji}} + (-1)^{i+j} \eta_M^{\delta_{j-i}} \frac{\tilde{A}_i}{A} \cos^k \tilde{\beta}_i u_{\tilde{\beta}_i} \right), \quad (3)$$

where:

$$\xi_i = \frac{(m+1)A}{2\pi d_i^2} \cos^m \alpha_i, \eta_M$$

is defined as the mirror reflection coefficient, and $\delta_k$ is a Dirac delta function. Here, $\beta_{ji}$, $\tilde{\beta}_i$, and $\tilde{A}_i$ are the incident angle at the j-th PD from the i-th LED, the incident angle of reflected (or blocked) light from i-th LED, and the effective area of each PD plane where receives the reflective light or is shaded by the mirror. In addition, k denotes the FoV coefficient of the PD and the Lambertian emission order is given as $$m = \frac{-\ln 2}{\ln\left(\cos \Phi_\frac{1}{2}\right)}, \quad (4)$$

where $\Phi_{1\,2}$ denotes the semi-angle at half-power of light emission from the LED. Each angle can be computed by trigonometric properties as $$\alpha_i = |\cos^{-1}(d_i \cdot t_i)| \quad (5)$$

$$\beta_{ji} = |\beta_i - (-1)^{i+j} \beta_a| \quad (6)$$

$$\tilde{\beta}_i = \beta_i + \beta_a, \quad (7)$$

where $d_i$ denotes the direction vector from the i-th LED to the j-th PD which is given by $$d_i = d_i = \frac{[x-(3-2i)x_o - y_o]^T}{d_i}$$

and $\beta_i = \cos^{-1}(y_0/d_i)$. Thus, using these angles, the effective area of PD plane which receives the reflected signals or is shaded by a mirror can be calculated by trigonometric properties as in $\tilde{A}_i = d_p \tilde{d}_i$, where $$\tilde{d}_i = \min\left( \frac{h_M \sin \beta_i}{\cos \beta_i}, d_p \right). \quad (8)$$

Deterministic MIMO LoS links were considered at the fixed receiver position and thus it was assumed that the channel matrix was known at the receiver. In order to de-correlate two independent data stream at the receiver, a zero-forcing (ZF) decorrelator was utilized that nulls the interference signals. By multiplexing the inverse of channel matrix with received signal, the received signals are computed as $$y_{zf} = s + H^{-1} n. \quad (9)$$

where the covariance matrix of AWGN vector is $\sigma^{-2}_n (H^H H)^{-1}$

The BER performance of the proposed AMDR can be analyzed in multiplexing MIMO-VLC. Mirror height and elevation angle for the receiver can be evaluated to optimize BER performance.

By using an OOK modulation scheme and the ZF decorrelator mentioned above, the BER of each independent data stream can be calculated as $$P_b(k) = Q\left(\sqrt{\frac{\rho}{[(H^H H)^{-1}]_{kk}}}\right), \quad (10)$$

where $Q(\bullet)$ denote the Q-function which is given by $Q(x)=\sqrt{1/2}\,\pi\int_x^\infty \exp(-t^2/2)dt$ and the electrical SNR per LED was defined as $\rho=P^2/\sigma^2_n$ and $[B]_{kk}$ represents k-th diagonal components of matrix B. Note that the BER performance is a function of height of mirror and elevation angle which can be optimized. A weighted-sum BER can be evaluated to alleviate the performance difference between the data streams. Moreover, in order to minimize the BER performance, the maximum BER of two data streams can be minimized. Equation (11) provides for minimizing the maximum BER which is given by:

$$\min_{h_M, \beta_a} \max_k P_b(k) \quad (11)$$
$$\text{s.t. } h_M \geq 0$$
$$0 \leq \beta_a \leq \frac{\pi}{2}.$$

Alternatively, it is equivalent to minimize the maximum of $[(H^H H)^{-1}]_{kk}$. By calculating the $[(H^H H)^{-1}]_{kk}$, the problem in equation (11) can be rewritten as $$\min_{h_M, \beta_a} \max_k \frac{h_{1k}^2 + h_{2k}^2}{(h_{11}h_{22} - h_{12}h_{21})^2} \quad (12)$$
$$\text{s.t. } h_M \geq 0$$
$$0 \leq \beta_a \leq \frac{\pi}{2}.$$

In the case of $0 \leq x < x_0$, it is readily apparent from a geometric viewpoint that the inequalities $h_{11} \geq h_{22}$ and $h_{21} \geq h_{12}$ hold, which means that the inequality $h^2_{11} + h^2_{21} \geq h^2_{12} + h^2_{22}$ always hold. Therefore, equation (12) can be rewritten as $$\max_{\beta_a} \max_{h_M} f(h_M) \quad (13)$$
$$\text{s.t. } h_M \geq 0$$
$$0 \leq \beta_a \leq \frac{\pi}{2}, \text{ where}$$
$$f(h_M) \triangleq \frac{(h_{11}h_{22} - h_{12}h_{21})^2}{h_{11}^2 + h_{21}^2}.$$

As an initial step, mirror height is optimized. The range of $h_M$ can be divided into three parts depending on $\tilde{d}_1$ and $\tilde{d}_2$ in (8), i.e., $\tilde{d}_1 = \tilde{d}_2 = d_p$, $\tilde{d}_1 \leq \tilde{d}_2 = d_p$, and $\tilde{d}_1 \leq \tilde{d}_2 < d_p$. For $\tilde{d}_1 = \tilde{d}_2 = d_p$, $(h_M)$ is constant. For $\tilde{d}_1 \leq \tilde{d}_2 = d_p$, it is noted that $h_{12}=0$ and $h_{22}=\xi 2\,(\cos^k\beta_{22}u_{\beta_{22}}+\eta M \cos^k\tilde{\beta}_2 u \tilde{\beta}_2)$ which are constant. Therefore, the optimization over $h_M$ can be rewritten as $$\max_{h_m} f(h_M) = \max_{h_M} \frac{h_{11}^2 h_{22}^2}{h_{11}^2 + h_{21}^2} = \min_{h_M} \frac{h_{21}}{h_{11}}. \quad (14)$$

Applying equation (3) and $\beta_{21}=\beta_1+\beta_a=\tilde{\beta}_1$ one can compute $$\frac{h_{21}}{h_{11}} = \frac{\cos^k \beta_{21} u_{\beta_{21}}\left(1 - \frac{\tilde{d}_1}{d_p}\right)}{\cos^k \beta_{11} u_{\beta_{11}} + \eta_M \frac{\tilde{d}_1}{d_p}\cos^k \beta_{21} u_{\beta_{21}}}, \quad (15)$$

which is a decreasing function over $\tilde{d}_1$ and minimized at $\tilde{d}_1 = d_p$. Correspondingly, $(h_M)$ is maximized at $\tilde{d}_1 = d_p$ for the range of $\tilde{d}_1 \leq \tilde{d}_2 = d_p$. For $\tilde{d}_1 \leq \tilde{d}_2 < d_p$, it is apparent that the following inequality:

$$f(h_M) \leq \frac{h_{11}^2 h_{22}^2}{h_{11}^2 + h_{21}^2} = \quad (16)$$

$$\frac{h_{11}^2 \xi_i^2 \left(\cos^k \beta_{22} u_{\beta_{22}} + \eta_M \frac{\tilde{d}_2}{d_p}\cos^k \tilde{\beta}_2 u_{\tilde{\beta}_2}\right)^2}{h_{11}^2 + h_{21}^2} < f(h_M)|_{\tilde{d}_2 = d_p},$$

where it means that the objective function in this range is always less than that in $\tilde{d}_1 \leq \tilde{d}_2 = d_p$. It is also noted that the objective function is an increasing function in this range since $$f(h_M) = \frac{h_{11}^2}{h_{11}^2 + h_{21}^2}(h_{22} - h_{12}h_{21}/h_{11})^2$$

and both $h^2_{11}/h^2_{11}+h^2_{21}$ and $(h_{22}-h_{12}h_{21}/h_{11})2$ are increasing functions. Finally, the optimal $h_M$ to maximize $f(h_M)$ can be found at $\tilde{d}_1=d_p$, i.e., $h^*_M \geq d_p \cos \tilde{\beta}_1/\sin \beta/$. With the optimal $h^*_M = d_p \cos \tilde{\beta}_1/\sin \beta_1$, $h_{12}=h_{21}=0$ and the problem in (13) is now represented as $$\max_{\beta_a} \cos^k(\beta_2 - \beta_a) u_{|\beta_2-\beta_a|} + \eta_M \cos^k(\beta_2 + \beta_a) u_{\beta_2+\beta_a} \quad (17)$$
$$\text{s.t. } 0 \leq \beta_a \leq \frac{\pi}{2}.$$

This represents the optimization problem solely with respect to elevation angle and one can solve it for the unit FoV coefficient.

Theorem 1 (Optimal AMDR): For $0 \leq x < x0$, the solution to min-max BER problem in 2×2 MIMO-VLC system with AMDR with k=1 is $$h_M^* = \frac{d_p \cos(\beta_1 + \beta_a^*)}{\sin \beta_1}, \quad (18)$$

where the optimal elevation angle of PD plane is chosen depending on the conditions on $\beta_2$ and FoV in Table I below:

TABLE 1

OPTIMAL ANGLE $\beta_a^*$ FOR DIFFERENT CONDITIONS

| $\beta_2$ | $\beta_g$ | max $g(\beta_a)$ | Optimal angle $\beta_a^*$ | Case No. |
|---|---|---|---|---|
| $0 \leq \beta_2 \leq \dfrac{FoV}{4}$ | — | — | $\beta_g$ | 1 |
| $\dfrac{FoV}{4} < \beta_2 \leq \dfrac{FoV}{2}$ | $\beta_g \leq \dfrac{FoV}{2} - \beta_2$ | $g(\beta_g) > 1$ | $\beta_g$ | 2 |
| | | $g(\beta_g) \leq 1$ | $\beta_g$ | 3 |
| | $\beta_g > \dfrac{FoV}{2} - \beta_2$ | $g\left(\dfrac{FoV}{2} - \beta_2\right) > 1$ | $\dfrac{FoV}{2} - \beta_2$ | 4 |
| | | $g\left(\dfrac{FoV}{2} - \beta_2\right) \leq 1$ | $\beta_2$ | 5 |
| $\beta_2 > \dfrac{FoV}{2}$ | — | — | $\beta_2$ | 6 |

Proof: Applying k=1 and neglecting the indicator function, one first considers the maximization of the objective function $g(\beta_a) = \cos(\beta_2 - \beta_a) + \eta_M \cos(\beta_2 + \beta_a)$. Taking the derivative of the objective function to be zero, $d_g/d\beta_a = 0$, the following equality holds $$\sin(\beta_2 - \beta_a) = \eta_M \sin(\beta_2 + \beta_a) \qquad (19)$$

One can see that there exists one maximum in $0 \leq \beta_a \leq \pi/2$. By solving the above equation, the angle that achieves the maximum of $(\beta_a)$ can be computed as $$\beta_g = \tan^{-1}\left(\dfrac{1 - \eta_M}{1 + \eta_M} \tan\beta_2\right). \qquad (20)$$

And the corresponding maximum value is given by:

$$g(\beta_9) = 1 + \eta_M^2 + 2\eta_M \cos(2\beta_2). \qquad (21)$$

Here it noted that this angle can be in the feasible region of $\beta_a$ depending on the indicator functions in the original objective function in equation (17), $\beta_2$, and FoV. The optimal $\beta_a$ is found depending on the feasible region of $\beta_a$ under the conditions of $\beta_2$ and FoV. If $\beta_2 > FoV/2$, $u_{\beta_2+\beta_a} = 0$ always holds and the corresponding objective function $\cos(\beta_2 - \beta_a)$ is maximized at $\beta_a = \beta_2$. For $FoV/4 < \beta_2 \leq FoV/2$, if $\beta_g + \beta_2 \leq FoV/2$, $\beta_g$ is in the feasible region. Under this condition, in order to find the optimal angle, a comparison is made between the maximum in $\beta_a + \beta_2 \leq FoV/2$ and the maximum in $\beta_a + \beta_2 > FoV/2$ since the objective functions in both regions are different due to the indicator function of $u_{\beta_a + \beta_2}$. The maximum in $\beta_a + \beta_2 \leq FoV/2$ can be computed as $$\max_{\beta_a \leq \frac{FoV}{2} - \beta_2} g(\beta_a) = \begin{cases} g(\beta_g), & \beta_g \leq \dfrac{FoV}{2} - \beta_2 \\ g\left(\dfrac{FoV}{2} - \beta_2\right), & \beta_g > \dfrac{FoV}{2} - \beta_2 \end{cases}, \qquad (22)$$

where the second condition implies that $\beta_g$ is not in the feasible region and $g(\beta_a)$ is the monotonically increasing function in this region. The maximum in $\beta_a + \beta_2 > FoV/2$ is already calculated as $(\beta_2) = 1$ with $u_{\beta_2+\beta_g} = 0$. Therefore, the optimal angle can be found by comparing the maximum values for both region which yields four Cases 2-5 in Table I depending on the conditions of $\beta_g \lessgtr FoV/2 - \beta_2$ and $\max \beta_a \leq FoV/2 - \beta_a \, g(\beta_a) \lessgtr 1$. Finally, for $0 \leq \beta_2 \leq FoV/4$, $\beta_g + \beta_2 \leq FoV/2$ always holds and thus max $g(\beta_a) = g(\beta_g)$ in the range of $\beta_a < FoV/2 - \beta_2$. For $\beta_a \geq FoV/2 - \beta_2$, the objective function with $u_{\beta_2 + \beta_a} = 0$ becomes $\cos(\beta_2 - \beta_a)$. By comparing the maximum values in both regions of $\beta_a$, it can be shown that $(\beta_g)$ is always maximum for $0 \leq \beta_2 \leq FoV/4$ as follows.

$$\max_{\beta_a \leq \frac{FoV}{2} - \beta_2} g(\beta_a) \geq \min_{0 \leq \beta_0 \leq \frac{FoV}{4}} \sqrt{1 + \eta_M^2 + 2\eta_M \cos(2\beta_2)} = \qquad (23)$$

$$\sqrt{1 + \eta_M^2 + 2\eta_M \cos\dfrac{FoV}{2}} \geq \sqrt{1 + \eta_M^2} \geq \max_{\beta_a \geq \frac{FoV}{2} - \beta_2} \cos(\beta_2 - \beta_a),$$

Remark 1: As evident in Theorem 1, the optimal elevation angle can be typically divided into two categories. If the mirror is beneficial, the elevation angle is oriented to maximize the received power aggregating the LoS light and reflected light, e.g. as in case 1, 2, and 4. On the other hand, if the mirror is not beneficial for optimization, the elevation angle is set to orient the PD plane into the direction of light propagation in order to maximize the received power of LoS light, e.g. as in case 3, 5, and 6. Remark 2 (Perfect mirror): If the receiver utilizes the perfect mirror with $\eta M = 1$, it is apparent that $\beta g = 0$ in (20) and $(\beta g) = 2 \cos \beta_2$. This signifies that, in some cases depending on the conditions of $\beta_2$ and FoV, it is not necessary to adjust the angle of the PD plane. From Table I, it corresponds to case 1 and 2. For $FoV/4 < \beta_2 \leq FoV/2$, case 4 and 5 never happens since the first and the second conditions are disjoint. The inequality of the third condition in case 2, $(\beta g) > 1$, can be rewritten as $\beta_2 < \pi 3$. Corollary 1.1 (Optimal AMDR with perfect mirror): For AMDR with perfect mirror, adjusting the elevation angle of the PD plane is not necessary $(\beta^* a = 0)$ when $\beta_2 \epsilon \{0 \leq \beta_2 \leq FoV/4\}$ or $\beta_2 \epsilon \{FoV/4 < \beta_2 \leq FoV/2, \beta_2 < \pi 3\}$. Otherwise, the elevation angle is adjusted to $\beta^* a = \beta_2$.

Validation of the Solution to the Minmax BER Optimization To calculate the maximum BER between two data streams, the system parameters for LEDs and PDs are listed in Table II below.

TABLE II

SYSTEM PARAMETERS FOR SIMULATION

| | Parameters | Values |
|---|---|---|
| LED | Location at $(x_0, y_0)$ and $(-x_0, y_0)$ | $(2, 3)$ and $(-2, 3)$[†] |
| | Direction vector of irradiation in center $(t_i)$ | $[0 \; -1]^T$ |
| | Semi-angle at half power $(\Phi_{1/2})$ | 60° |
| | Lambertian emission order (m) | 1 |
| MDR | Location at $(x, 0)$ | $x = 0$ or $x = 1$ |
| | Direction vector of PD orientation $(r_j)$ | $[0 \; 1]^T$ |
| | Receiver field-of-view (FoV) | 120° |
| | FoV coefficient (k) | 1 |
| | Active area of PD (A) | 1 cm$^2$ |
| | Length of one side at PD plane $(d_p)$ | 1 cm |
| | Height of mirror $(h_M)$ | Optimal value in (18) |
| | Reflection coefficient of mirror $(\eta_M)$ | 0.466[‡] |

[†]The unit of distance is meter (m).
[‡]Arbitrarily chosen to fit the cases 1 and 4 in Table 1. Typically it is close to one.

Figure 15:
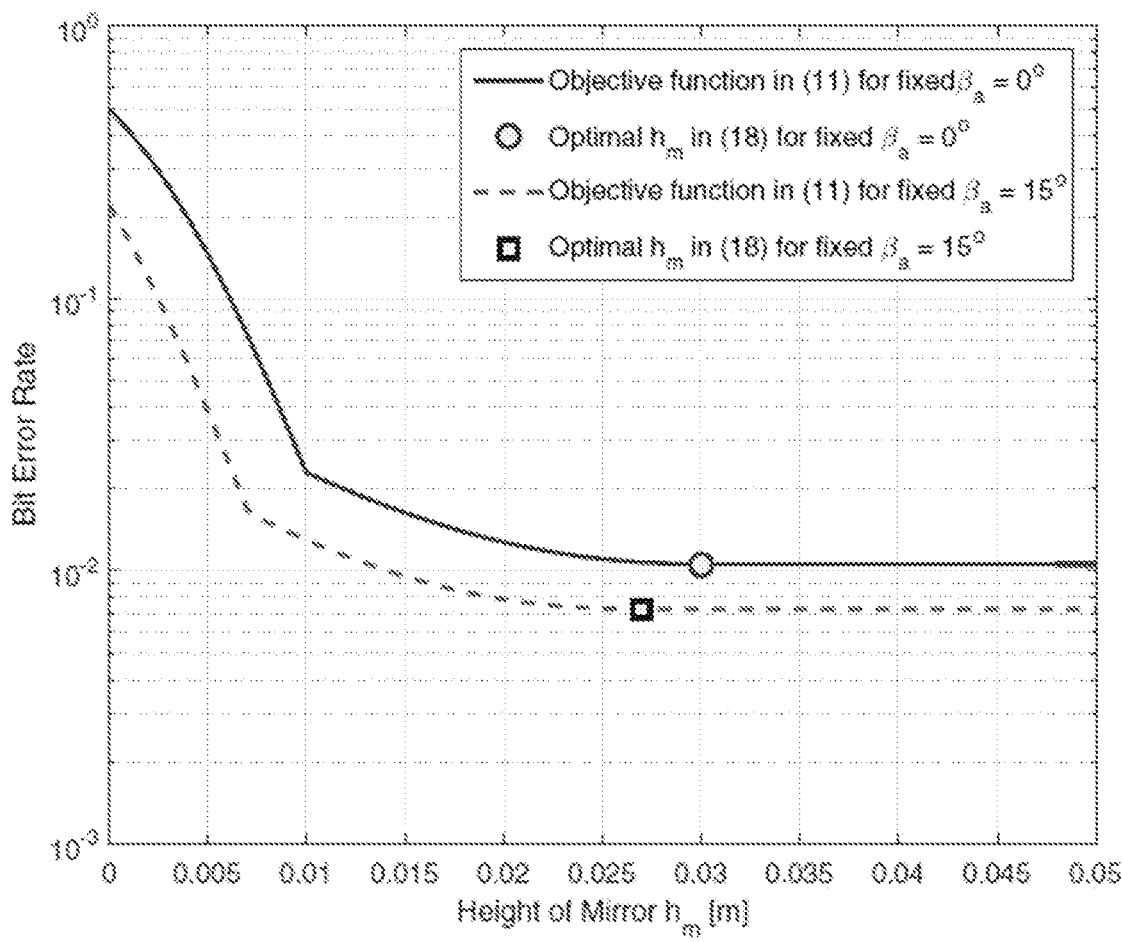
FIG. 15 illustrates a graphical representation of bit error rate and mirror height.

The receiver position was assumed to be x=1. FIG. 15 illustrates the objective function in equation (11) with respect to the height of mirror when the elevation angle is fixed. For two fixed elevation angles, it is shown that the objective function is minimized at $hM \geq dp \cos \tilde{\beta}1 \sin \beta1$ which is consistent with our conclusion in Theorem 1. Minimum optimal heights of mirror for $\beta a=0°$ and 15° are given by $h^*M=0.03$ and 0.0264 in equation (18) which results in minimum of BER in FIG. 15.

Figure 16:
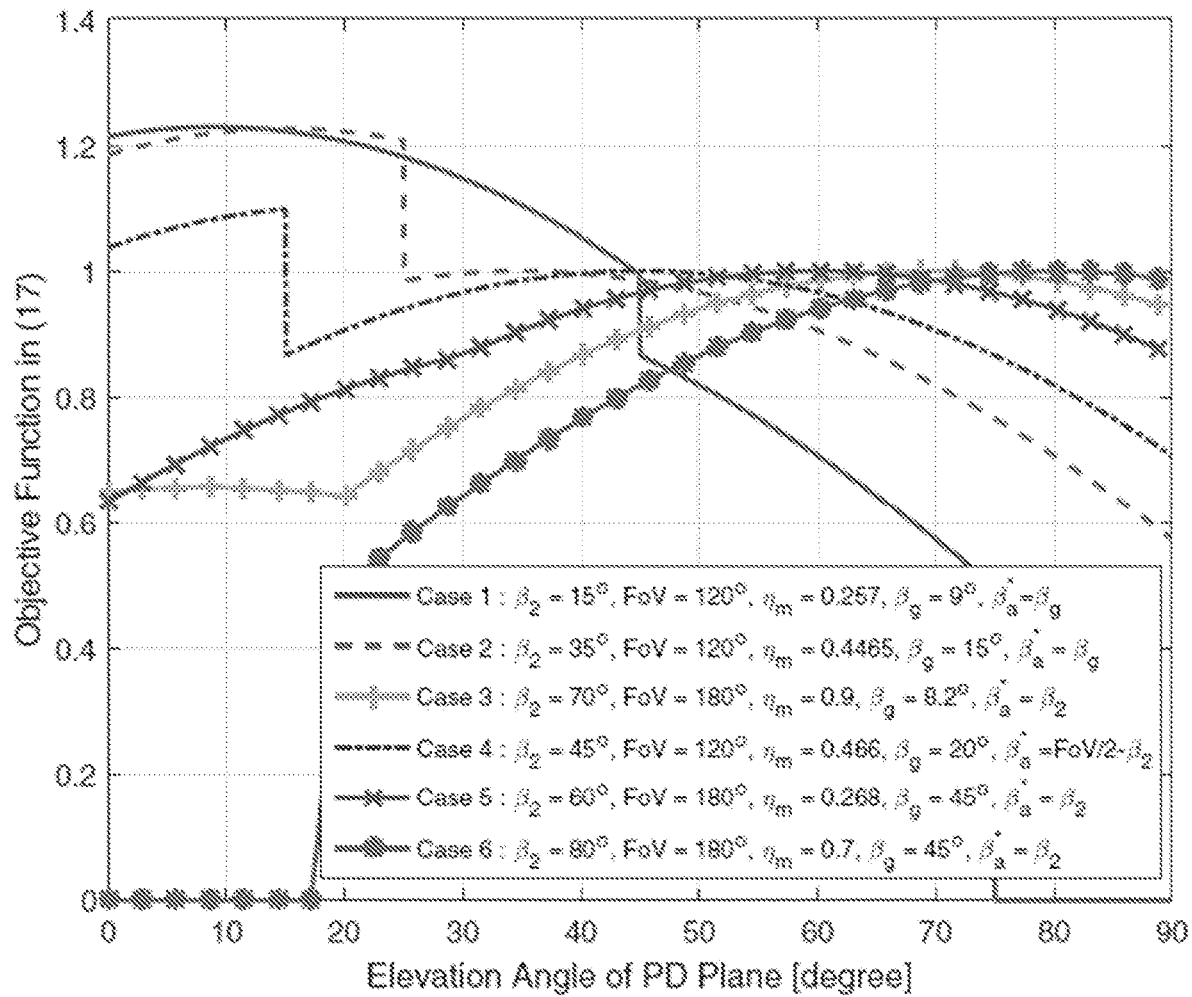
FIG. 16 illustrates a graphical representation of objective function and elevation angle.

FIG. 16 illustrates the objective function in equation (17) for different cases depending on $\beta2$, $\eta M$ and FoV. It is noted that $\beta2$, $\eta M$, and FoV were arbitrarily chosen to fit each case in Table I resulting in different optimal elevation angle. As can be seen in the figure, each case can occur indeed and the optimal elevation angle of PD plane $\beta^*a$ which was derived is shown to be really optimal to maximize the objective function for each case.

Bit Error Rate

The system model in FIG. 13 was considered along with the system parameters in Table II to evaluate the maximum BER of two data streams in 2×2 multiplexing MIMO-VLC system. For comparison, MIMO-VLC non-imaging receivers such as LBR, ADR, and pure MDR were considered. For LBR, specific channel gain from the i-th LED to j-th PD are perfectly blocked to reduce the correlation of channel matrix and thus it was assumed that non-diagonal elements of channel matrix at LBR are zero, i.e., hji=0 for all i/=j. For ADR, the optimal elevation angle of PD plane was numerically obtained to maximize the channel capacity for each receiver position. The MDR only utilizes the mirror with optimal height to reduce the correlation which meant that the angle of PD orientation was always zero, $\beta a=0$.

Figure 17:
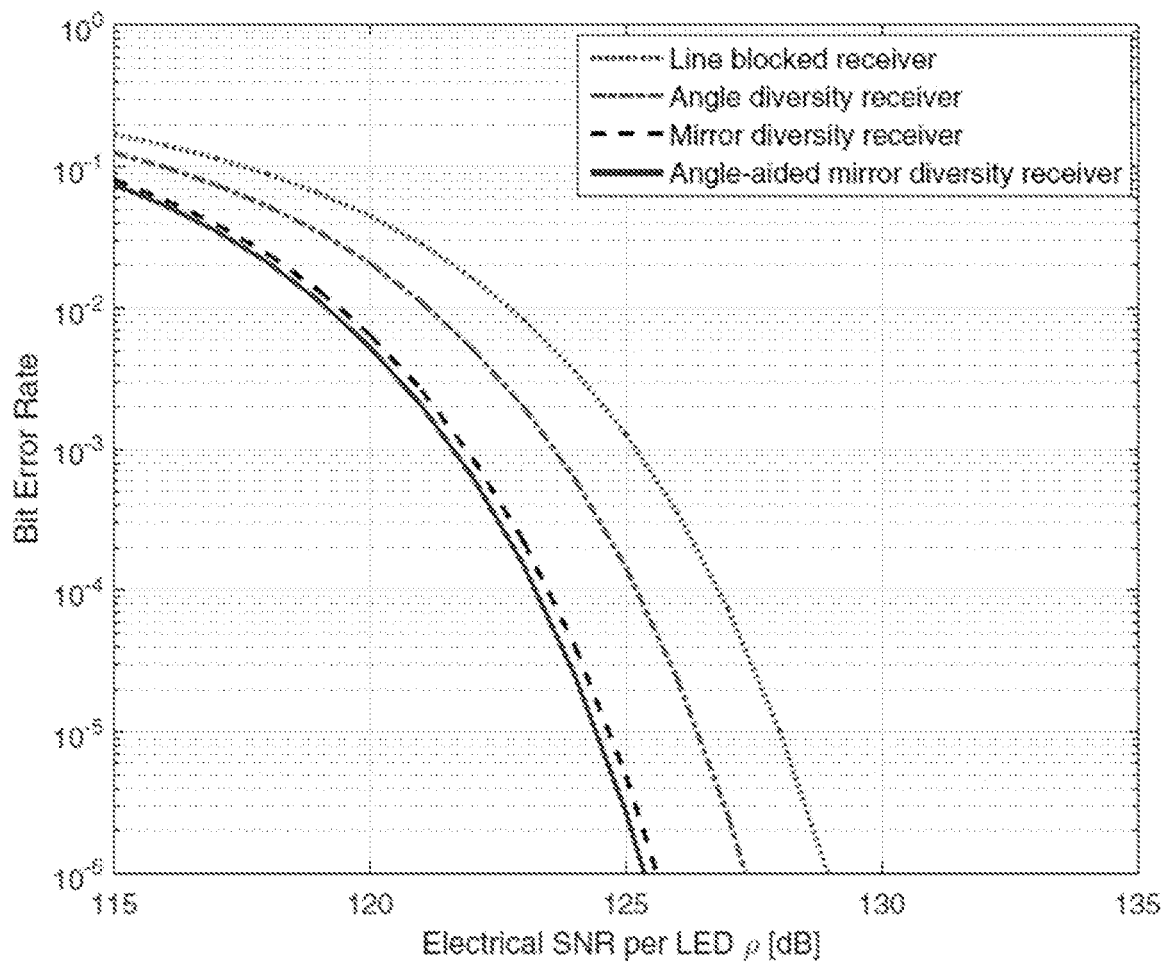
FIG. 17 illustrates a graphical representation of bit error rate and SNR for various receivers.

FIG. 17 illustrates the maximum BER of two data streams in 2×2 MIMO-VLC system with various receivers at the receiver position x=0. This figure illustrates that the proposed AMDR outperforms the existing advanced receivers at all the SNR range of interest. Especially, it is slightly better than pure MDR which means that most of the gain over other type of receivers results from the constructive effect of mirror by improving the channel gain. Almost 2 dB gain over ADR and 4 dB gain over LBR was observed.

Figure 18:
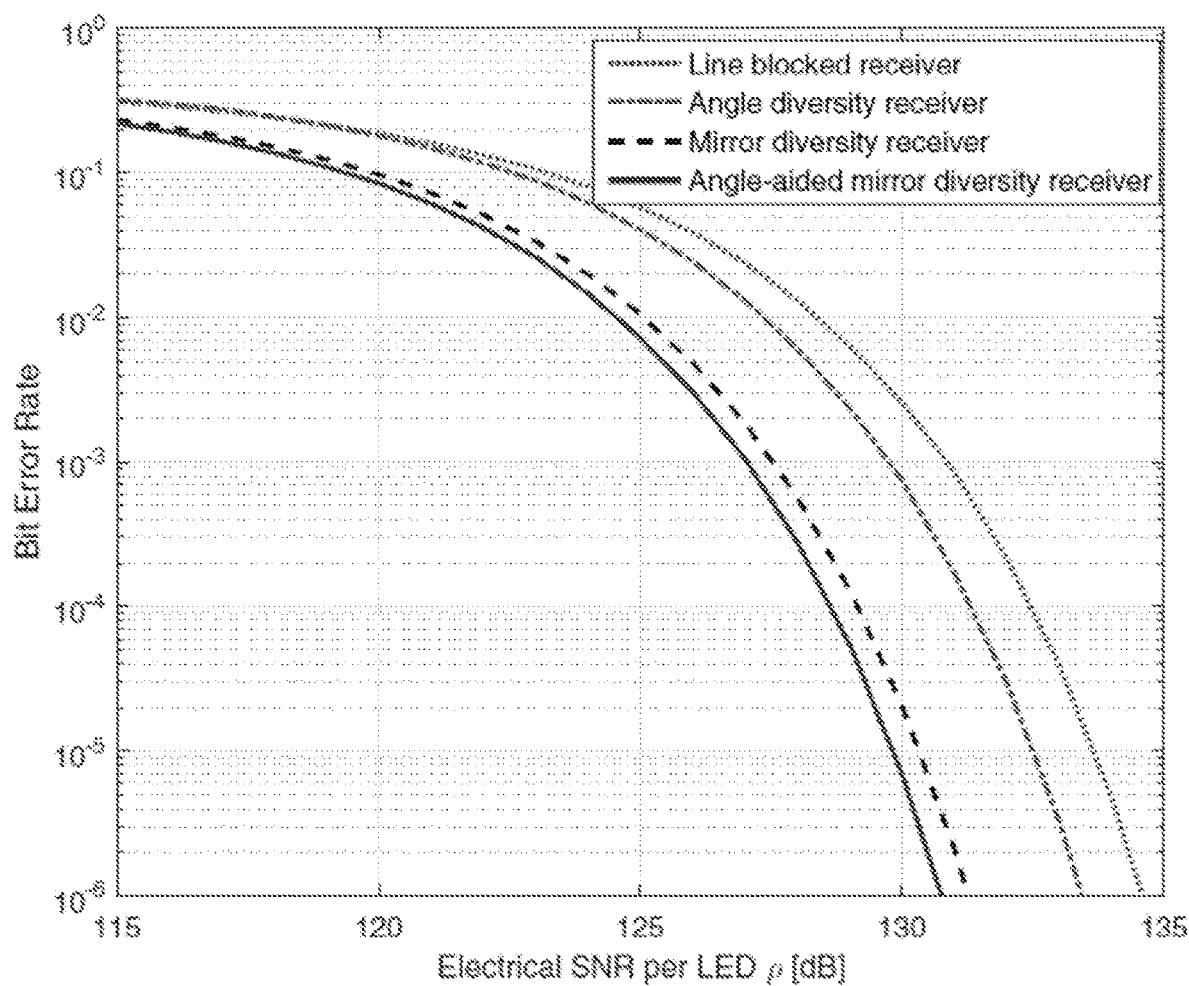
FIG. 18 illustrates a graphical representation of bit error rate and SNR.

In FIG. 18 the receiver position was changed to x=1 and the maximum BER was evaluated again. As illustrated, the BER performance became worse that that at position x=0 in FIG. 17 since the channel gains from LED 2 to PDs were weaker than that at position x=0 due to the increase of transmission distance. Angle diversity gain was increased compared with that in FIG. 17. In this case, it was observed that the AMDR embodiment of the present invention yielded almost 3 dB gain over ADR and 4 dB gain over LBR.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus, the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

Various examples have been described. These and other examples are within the scope of the following claims.

What is claimed is:

1. A photodetector receiver for converting an optical signal to an electrical signal, comprising:
   a pair of photodiodes each having an optical-signal-receiving area on a surface thereof; and
   a two-sided mirror positioned between the pair of photodiodes, wherein the mirror is configured to redirect at least some of the light emitted from a remote light source toward the optical-signal-receiving area of one the pair of photodiodes and is configured to block at least some of the light emitted from the remote light source from the optical-signal-receiving area of the other photodiode.

2. The photodetector receiver of claim 1, wherein the remote light source includes a pair of light emitting sources, and wherein light from one of the pair of light emitting sources is reflected toward one of the pair of photodiodes and light from the other of the pair of light emitting sources is reflected toward the other of the pair of photodiodes.

3. The photodetector receiver of claim 1, wherein the optical-signal-receiving areas are defined upon a generally planar surface and the mirror is generally perpendicularly aligned relative to the surface.

4. The photodetector receiver of claim 3, wherein the pair of photodiodes are generally equally spaced from the mirror.

5. The photodetector receiver of claim 1, wherein a surface at one of the optical-signal-receiving areas of one of the pair of photodiodes is angled relative to a surface at the other one of the optical-signal-receiving areas with each optical-signal-receiving area being directed away from the other.

6. The photodetector receiver of claim 5, wherein the surfaces are angled away from the mirror, with the mirror being centrally positioned between the pair of photodiodes.

7. The photodetector receiver of claim 1, wherein the mirror redirects at least some of the light that would otherwise fall on an adjacent one of the pair of photodiodes.

8. The photodetector receiver of claim 1, used in an optical wireless multiple input multiple output (MIMO) system wherein the remote light source includes a plurality of pulsed light emitters conveying an optical data signal toward the pair of photodiodes configured within a MIMO receiver, and the mirror is configured as a plurality of mirrors positioned between adjacent pairs of the plurality of photodiodes, with each mirror redirecting light from at least one of the light emitters toward one of the photodiodes that would otherwise not be received at an optical-signal-receiving area of the photodiode.

9. The photodetector receiver of claim 8, wherein an optical-signal-receiving surface of the receiver is general planar and at least some of the plurality of mirrors are aligned generally perpendicularly to the surface.

10. The photodetector receiver of claim 9, wherein the surface is angled resulting in optical-signal-receiving areas of the photodiodes being aligned in different directions relative to the plurality of mirrors.

11. A method of directing light within a photodetector receiver, comprising:
providing a plurality of photodiodes on a receiver surface;
aligning the plurality of photodiodes to receive multiple optical light signals from multiple light sources;
providing a two-sided mirror between one pair of the plurality of photodiodes; and
positioning the mirror to reflect at least some light from one of the plurality of light sources toward one of the pair of photodiodes, with the mirror also blocking at least some light from a different one of the plurality of light sources from being received at the one of the pair of photodiodes.

12. The method of claim 11, wherein the receiver surface is generally planar and the step of positioning the mirror includes aligning the mirror to be generally perpendicular to the receiver surface.

13. The method of claim 11, wherein the receiver surface of one of the optical-signal-receiving areas of one of the plurality of photodiodes is angled relative to other surfaces so that optical-signal-receiving areas of the photodiodes are aligned in different directions.

14. The method of claim 13, wherein an elevation angle of the receiver surface is optimized to reduce bit error rate of the system.

15. A photodetector receiver comprising:
a receiver surface;
a pair of photodiodes positioned on the receiver surface, with each photodiode having an optical-signal-receiving area; and
a mirror having two reflective sides being configured to block light emitted from a light source from one of the pair of photodiodes and configured to redirect the blocked light onto the other one of the pair of photodiodes.

16. The photodetector receiver of claim 15, wherein the optical-signal-receiving areas of the pair of photodiodes are aligned in different directions.

17. The photodetector receiver of claim 16, wherein the light source includes a pair of light emitters and the pair of photodiodes are configured to provide angle diversity to the receiver.

18. The photodetector receiver of claim 15, wherein the receiver includes a plurality of mirrors and a plurality of pairs of photodiodes.

19. The photodetector receiver of claim 15, wherein the mirror is one of a pair of mirrors for reflecting light toward one of the pair of photodiodes.

20. The photodetector receiver of claim 19, wherein the pair of mirrors are generally perpendicular to each other.

* * * * *